(12) United States Patent
Okumura et al.

(10) Patent No.: US 8,335,258 B2
(45) Date of Patent: Dec. 18, 2012

(54) FRAME INTERPOLATION DEVICE AND FRAME INTERPOLATION METHOD

(75) Inventors: Akihiro Okumura, Kanagawa (JP); Tetsujiro Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 799 days.

(21) Appl. No.: 12/539,188

(22) Filed: Aug. 11, 2009

(65) Prior Publication Data

US 2010/0054336 A1 Mar. 4, 2010

(30) Foreign Application Priority Data

Aug. 26, 2008 (JP) ................................ 2008-216641

(51) Int. Cl.
*H04N 7/12* (2006.01)
(52) U.S. Cl. ............................. 375/240.16; 375/240.12
(58) Field of Classification Search .................. 375/240, 375/240.01, 240.12, 240.16
See application file for complete search history.

(56) References Cited

U.S. PATENT DOCUMENTS 5,808,685 A * 9/1998 Jung ....................... 375/240.16

FOREIGN PATENT DOCUMENTS

JP 2004-128702 4/2004

* cited by examiner

*Primary Examiner* — Allen Wong
(74) *Attorney, Agent, or Firm* — Oblon, Spivak, McClelland, Maier & Neustadt, L.L.P.

(57) ABSTRACT

A frame interpolation device includes: a unit dividing two temporally different reference frames of moving image signal into block units; a unit detecting motion vectors in block units in accordance with correlation between blocks of the reference frames; a unit obtaining at least first and second motion vectors from the statistical amount of the motion vectors; a unit estimating the first or second motion vector for each block in accordance with the obtained first and second motion vectors; a unit translating the first and second motion vectors through a generated pixel in an interpolated frame between the reference frames, setting local areas at four points of the start and end points of the first and second motion vectors as search areas, and identifying the first or second motion vector from the search areas; and a unit performing motion compensation on the pixel by using the first or second motion vector.

9 Claims, 24 Drawing Sheets

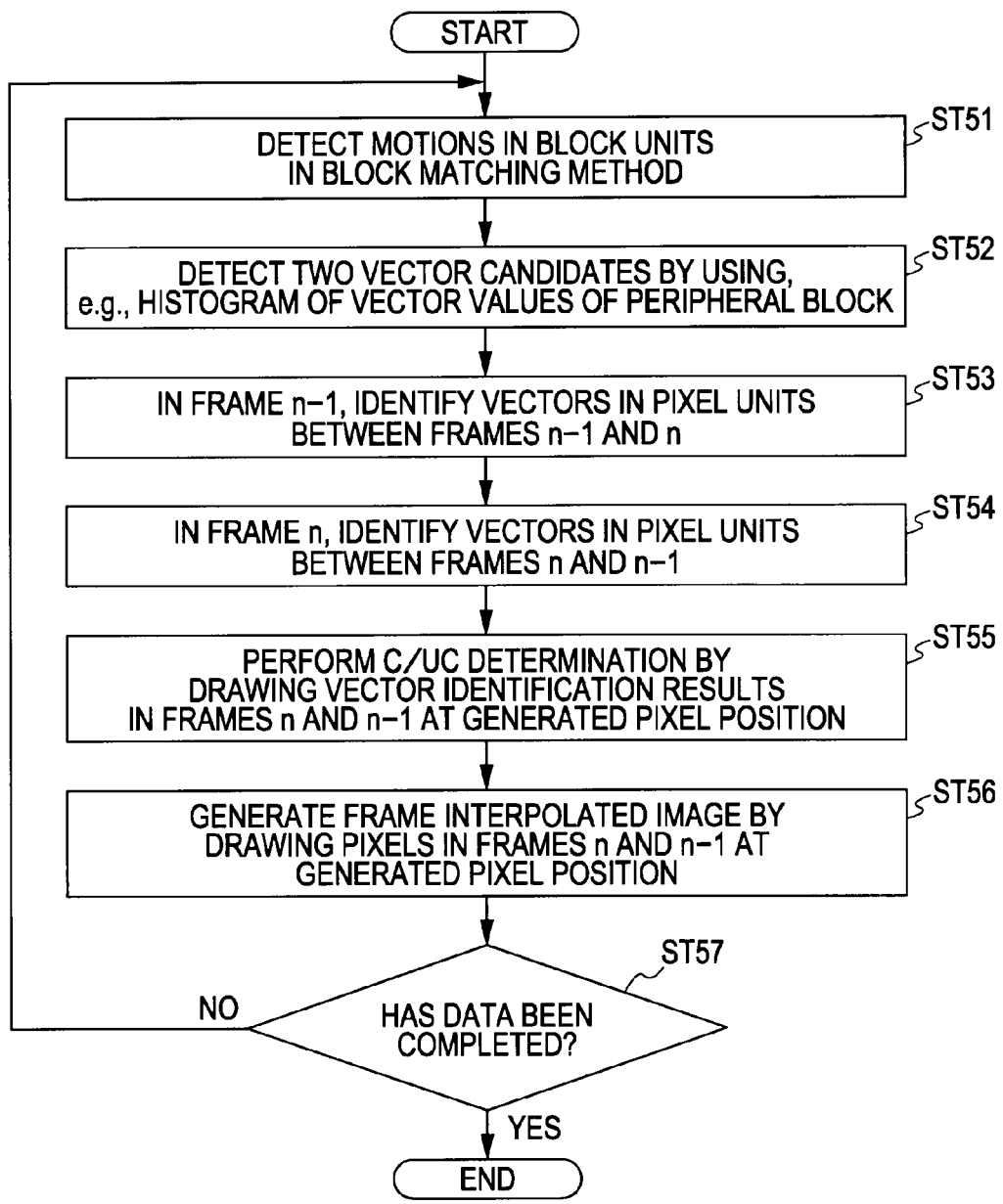

○ : CENTER
◉ : CLASS AND PREDICTION TAP
◎ : PREDICTION TAP

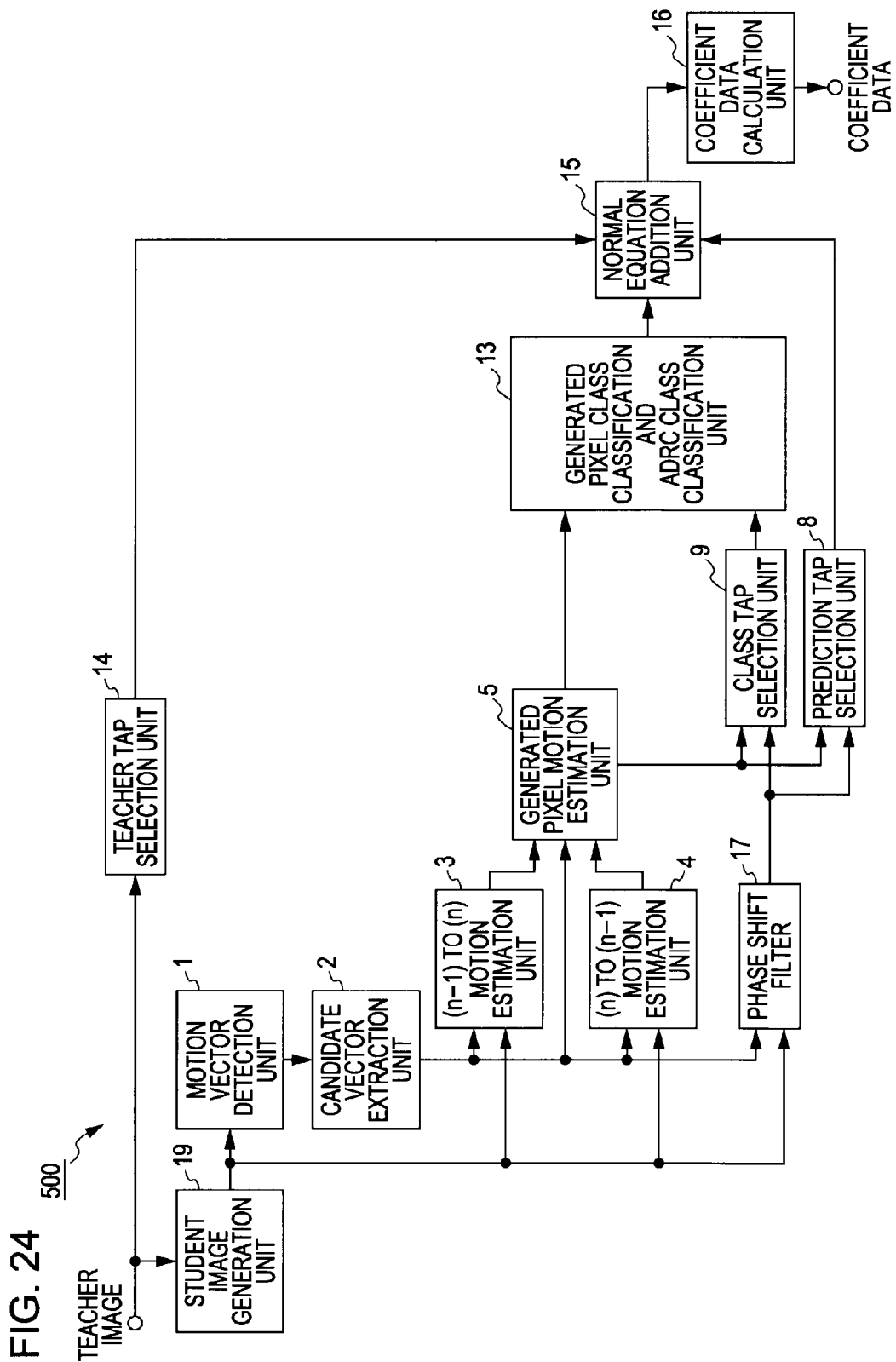

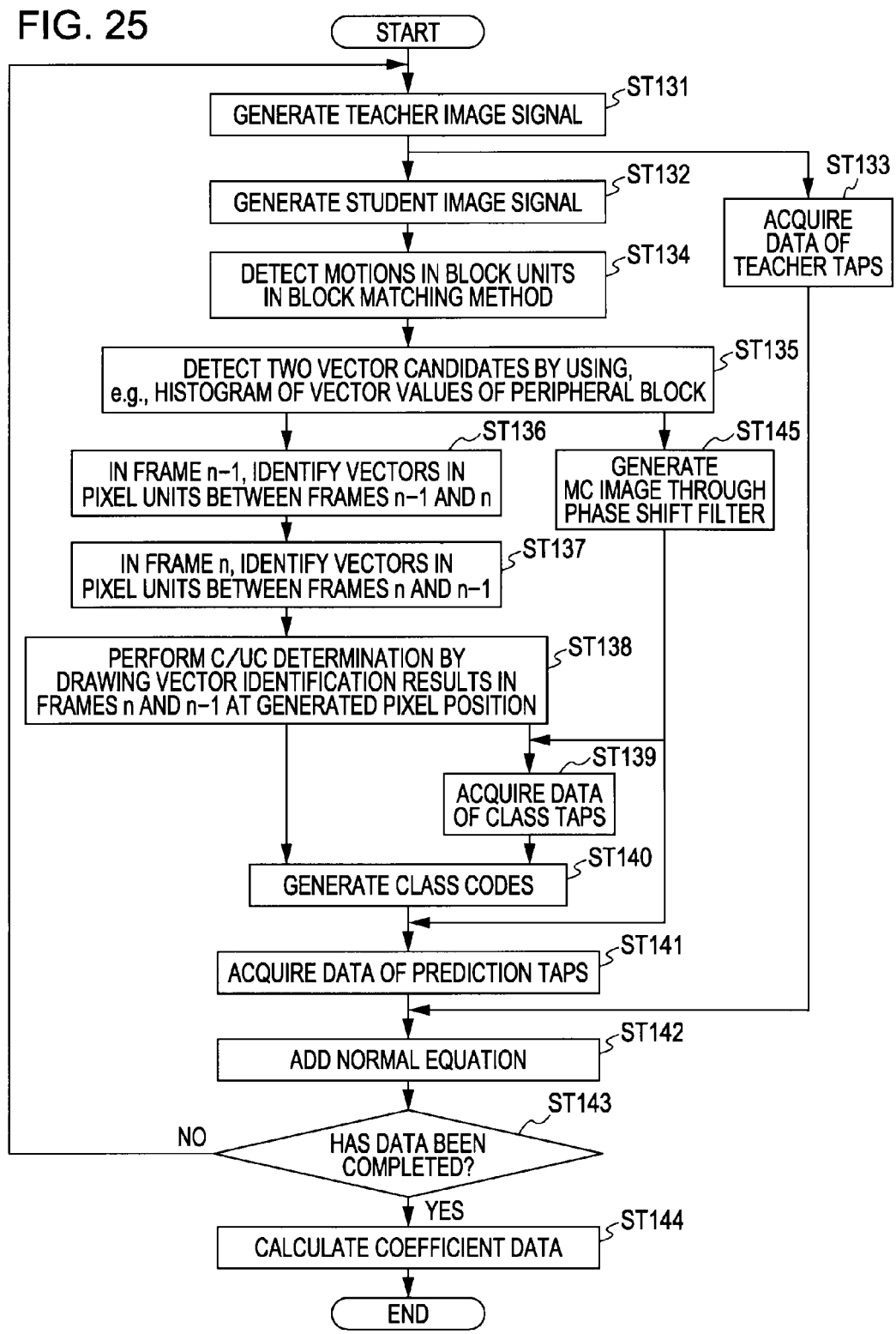

FRAME INTERPOLATION DEVICE AND FRAME INTERPOLATION METHOD

BACKGROUND OF THE INVENTION

1. Field of the Invention

The present invention relates to a frame interpolation device and a frame interpolation method for generating at least one or more generated frames between adjacent frames to reduce the intervals between display frames in the reproduction of a moving image. Specifically, according to the present invention, a first motion vector and a second motion vector are translated to pass through the position of a generated pixel in an interpolated frame, and local areas at four points of the start points and the end points of the translated first and second motion vectors are set to be search areas. Then, the first or second motion vector is identified from the search areas. Accordingly, it is possible to distinguish a covered background area and an uncovered background area with a small processing load, and to reduce the deterioration of a boundary area between a foreground and a background in the covered area and the uncovered area.

2. Description of the Related Art

In recent years, liquid crystal displays and organic EL (Electro-Luminescence) displays have been spreading. In such hold-type displays which continue to display a previous frame until an image is newly written, issues of blurring phenomenon and motion jerkiness arise. The blurring phenomenon occurs when the eyes of an observer follow the motion of a moving object in the display of a moving image. In the motion jerkiness, an unnatural motion occurs in the display of a moving image formed by a small number of frames.

The above-described issues can be addressed by reducing the intervals between display frames. To do so, a new frame should be generated from and interpolated between adjacent frames. As a specific method of generating the interpolated frame, it is possible to obtain the interpolated frame by determining a motion vector in accordance with the block matching method or the like and performing motion compensation.

In this method, however, there is an issue in that the search for the motion vector is prevented in a covered background area and an uncovered background area generated in front and rear of a moving object, and thus that correct interpolation is prevented.

To address this issue, Japanese Unexamined Patent Application Publication No. 2004-128702 discloses, as a frame interpolation method in consideration of the covered background area and the uncovered background area, a frame interpolation method which performs correct frame interpolation even in the covered and uncovered areas. According to the frame interpolation method of this patent application publication, local areas indicated by translated first and second motion vectors are detected as search areas. Then, on the basis of the search areas and by the use of four reference frames, the covered area and the uncovered area are detected, and the motion compensation is performed, to thereby generate an interpolated frame.

SUMMARY OF THE INVENTION

In the frame interpolation method described in the above patent application publication, however, four reference frames are used. Therefore, there are issues such as an increase in the hardware size and a system delay (time difference between the input of an input image and the output of an output image).

The present invention has been made to address the above-described issues. It is desirable in the present invention to provide a frame interpolation device and a frame interpolation method capable of distinguishing a covered background area and an uncovered background area with a small processing load, and reducing the deterioration of a boundary area between a foreground and a background in the covered area and the uncovered area.

To address the above-described issues, a frame interpolation device according to an embodiment of the present invention includes a block division unit, a motion vector detection unit, a candidate vector extraction unit, a block motion estimation unit, a generated pixel motion estimation unit, and a frame interpolation unit. The block division unit is configured to divide a first reference frame of a moving image signal and a second reference frame temporally preceding the first reference frame into predetermined block units. The motion vector detection unit is configured to detect a plurality of motion vectors in block units on the basis of the correlation between respective blocks of the first and second reference frames divided by the block division unit. The candidate vector extraction unit is configured to calculate the statistical amount of the plurality of motion vectors detected by the motion vector detection unit, and obtain at least first and second motion vectors from the statistical amount. The block motion estimation unit is configured to estimate the first or second motion vector for each of the blocks on the basis of the first and second motion vectors obtained by the candidate vector extraction unit. The generated pixel motion estimation unit is configured to translate the first and second motion vectors to pass through the position of a generated pixel in an interpolated frame provided between the first and second reference frames, set local areas at four points of the start points and the end points of the translated first and second motion vectors to be search areas, and identify from the search areas the first or second motion vector estimated by the block motion estimation unit. The frame interpolation unit is configured to perform motion compensation on the generated pixel by using the first or second motion vector identified by the generated pixel motion estimation unit.

In the frame interpolation device according to the embodiment of the present invention, the motion vector detection unit detects the plurality of motion vectors in the block units on the basis of the correlation between the respective blocks of the first and second reference frames. The candidate vector extraction unit calculates the statistical amount of the plurality of motion vectors detected by the motion vector detection unit, and obtains at least the first and second motion vectors from the statistical amount. The block motion estimation unit estimates the first or second motion vector for each of the blocks on the basis of the first and second motion vectors obtained by the candidate vector extraction unit. The generated pixel motion estimation unit translates the first and second motion vectors to pass through the position of the generated pixel in the interpolated frame provided between the first and second reference frames. Then, the generated pixel motion estimation unit sets local areas at four points of the start points and the end points of the translated first and second motion vectors to be search areas, and identifies from the search areas the first or second motion vector estimated by the block motion estimation unit. Accordingly, it is possible to distinguish a covered background area and an uncovered background area with a small processing load, and to reduce the deterioration of a boundary area between a foreground and a background in the covered area and the uncovered area.

To address the above-described issues, a frame interpolation method according to an embodiment of the present invention includes the steps of: dividing a first reference frame of a moving image and a second reference frame different from the first reference frame in the time direction into predetermined block units; detecting a plurality of motion vectors in block units on the basis of the correlation between respective blocks of the divided first and second reference frames; calculating the statistical amount of the detected plurality of motion vectors, and obtaining at least first and second motion vectors from the statistical amount; estimating the first or second motion vector for each of the blocks on the basis of the obtained first and second motion vectors; translating the first and second motion vectors to pass through the position of a generated pixel in an interpolated frame provided between the first and second reference frames; setting local areas at four points of the start points and the end points of the translated first and second motion vectors to be search areas, and estimating the first or second motion vector from the search areas; and performing motion compensation on the generated pixel by using the estimated first or second motion vector.

The frame interpolation device and the frame interpolation method according to the embodiments of the present invention translate the first and second motion vectors to pass through the position of the generated pixel in the interpolated frame, set the local areas at four points of the start points and the end points of the translated first and second motion vectors to be the search areas, and identify the first or second motion vector from the search areas.

With this configuration, it is possible to prevent an issue of the generation of a gap with no image data and a portion with overlapping image data in the interpolated frame. It is also possible to reduce the possibility of selecting an incorrect motion vector, and to achieve correct frame interpolation in a covered background area and an uncovered background area by using two reference frames, i.e., a small number of reference frames.

BRIEF DESCRIPTION OF THE DRAWINGS

FIG. 9 is a flowchart illustrating an operation example of the frame interpolation device;

FIG. 24 is a block diagram illustrating a configuration example of a coefficient data generation device; and FIG. 25 is a flowchart illustrating an operation example of the coefficient data generation device.

DESCRIPTION OF THE PREFERRED EMBODIMENTS

Subsequently, with reference to the drawings, a frame interpolation device and a frame interpolation method according to an embodiment of the present invention will be described. In the present example, description will be made of a case in which an input image signal (moving image signal) Din is a 60 Hz progressive signal, and in which an interpolated frame is generated for the 60 Hz progressive signal at a temporally central position (on an interpolated frame plane) between two adjacent reference frames n and n−1 and inserted between the two reference frames n and n−1 to convert the 60 Hz progressive signal into a 120 Hz progressive signal.

Figure 1:
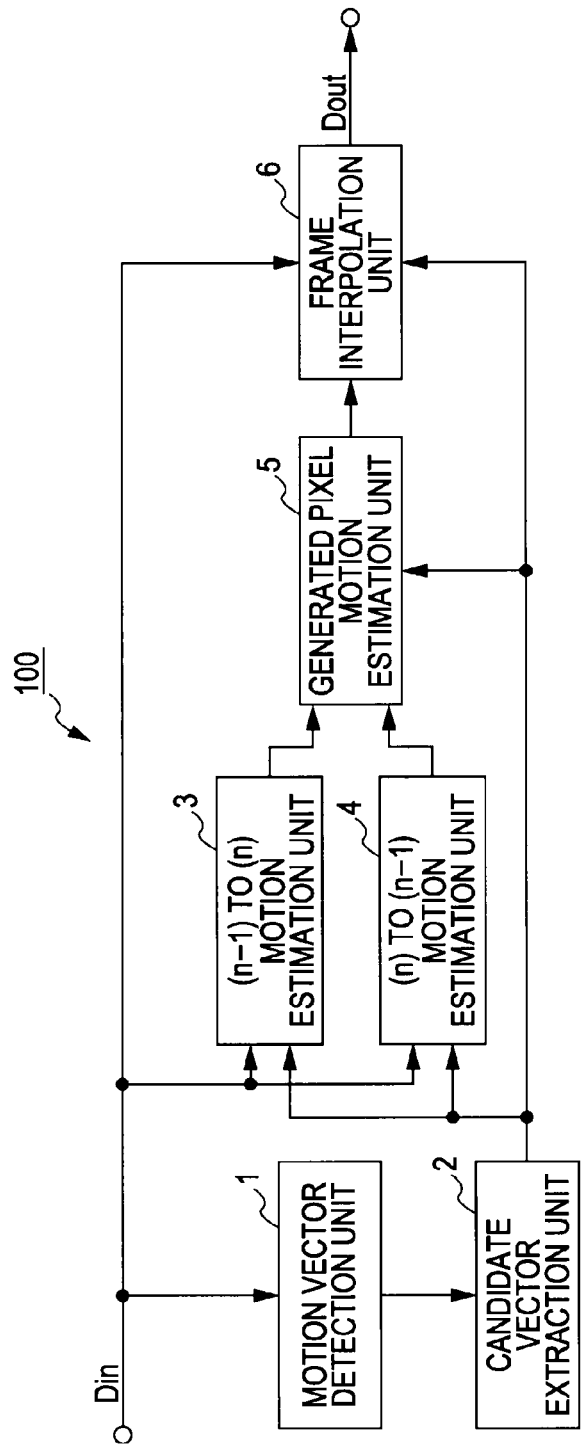
FIG. 1 is a block diagram illustrating a configuration example of a frame interpolation device as a first embodiment of the present invention.
Figure 2:
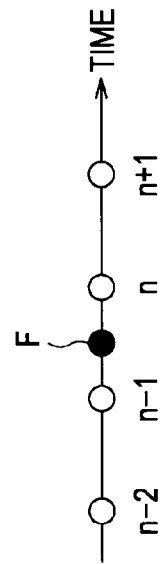
FIG. 2 is a schematic diagram illustrating an interpolation position of an interpolated frame.

FIG. 1 is a block diagram illustrating a configuration example of a frame interpolation device 100 as a first embodiment of the present invention. FIG. 2 is a schematic diagram illustrating an interpolation position of a generated interpolated frame F. Two frames between which the interpolated frame F is inserted, as illustrated in FIG. 2, are referred to as reference frames n and n−1. The interpolated frame F is inserted at the temporally central position between the reference frames n and n−1. Herein, the position and number of inserted frames are not particularly limited.

The frame interpolation device 100 illustrated in FIG. 1 includes a motion vector detection unit 1, a candidate vector extraction unit 2, an (n−1) to (n) motion estimation unit 3, an (n) to (n−1) motion estimation unit 4, a generated pixel motion estimation unit 5, and a frame interpolation unit 6.

The motion vector detection unit 1 illustrated in FIG. 1 obtains motion vectors in block units of approximately 8 by 8 pixels commonly used in the block matching method, the gradient method, and so forth. In the present example, the reference frames n−1 and n have been divided into predetermined block units by a not-illustrated block division unit.

The motion vector detection unit 1 selects a target block from the reference frame n−1, and selects a search range from the reference frame n. The motion vector detection unit 1 performs block matching between the target block and a plurality of search blocks in the search range, and determines the motion vector of the target block to be a vector indicating a search block having the smallest difference absolute value sum, for example. The motion vector determined here is temporarily stored in a not-illustrated memory.

To obtain a background motion first, the candidate vector extraction unit 2 converts the data of all motion vectors obtained by the motion vector detection unit 1 into a histogram, and determines a motion vector indicating the maximum value of the histogram to be a background vector representing the motion of the background. Then, the candidate vector extraction unit 2 converts the motion vectors in the periphery of a target block $BK_{n-1}$ (see FIG. 3A, for example) including a generated pixel into a histogram, and obtains a motion vector indicating the maximum value of the histogram and a motion vector indicating the second local maximum value, for example. The candidate vector extraction unit 2 obtains the candidate vectors of the above-described target block $BK_{n-1}$ by determining a motion vector close to the previously obtained background vector to be the first motion vector and a motion vector far from the background vector to be the second motion vector. That is, the candidate vector extraction unit 2 obtains, as the candidate vectors of the target block $BK_{n-1}$, the first motion vector representing the motion of the background and the second motion vector representing the motion of the foreground such as an object, and outputs the obtained vectors to the (n−1) to (n) motion estimation unit 3 and the (n) to (n−1) motion estimation unit 4.

The motion vectors to be obtained are not limited to the first and second motion vectors, and thus the third motion vector may be obtained. As a method of obtaining the third motion vector, a motion vector indicating the third local maximum value or the stationary state is determined to be the third motion vector. This is because, if the motion vector indicating the stationary state is not selected as a candidate, the deterioration of an image is noticeable.

Figure 3A:
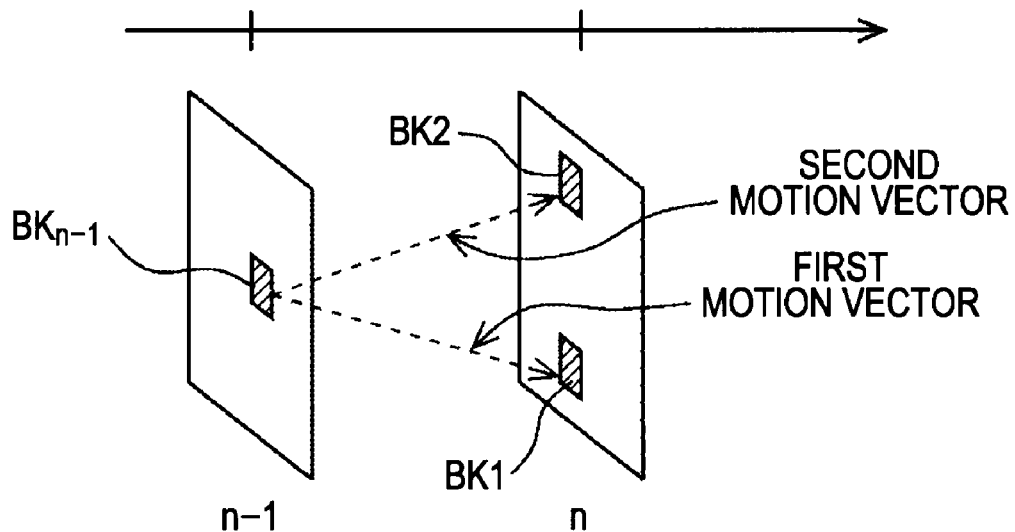
FIGS. 3A and 3B are schematic diagrams illustrating operation examples of an (n−1) to (n) motion estimation unit and an (n) to (n−1) motion estimation unit.

The (n−1) to (n) motion estimation unit 3 calculates the correlation between the target block $BK_{n-1}$ and the blocks indicated by the first and second motion vectors of the target block $BK_{n-1}$. For example, the (n−1) to (n) motion estimation unit 3 calculates the difference absolute value sums between the target block $BK_{n-1}$ and blocks BK1 and BK2 in the reference frame n indicated by the first and second motion vectors of the target block $BK_{n-1}$ in the reference frame n−1 illustrated in FIG. 3A. FIG. 3A is a schematic diagram illustrating an operation example of the (n−1) to (n) motion estimation unit 3. The (n−1) to (n) motion estimation unit 3 selects the motion vector corresponding to the smaller difference absolute value sum. Herein, in a covered background area (hereinafter referred to as a covered area) in the reference frame n−1 illustrated in FIG. 4, a pixel for which the motion vector is to be obtained is absent on the reference frame n. Therefore, a correct motion vector is not obtained. Herein, a covered area refers to an area hidden along with the motion of the foreground (object).

Figure 3B:
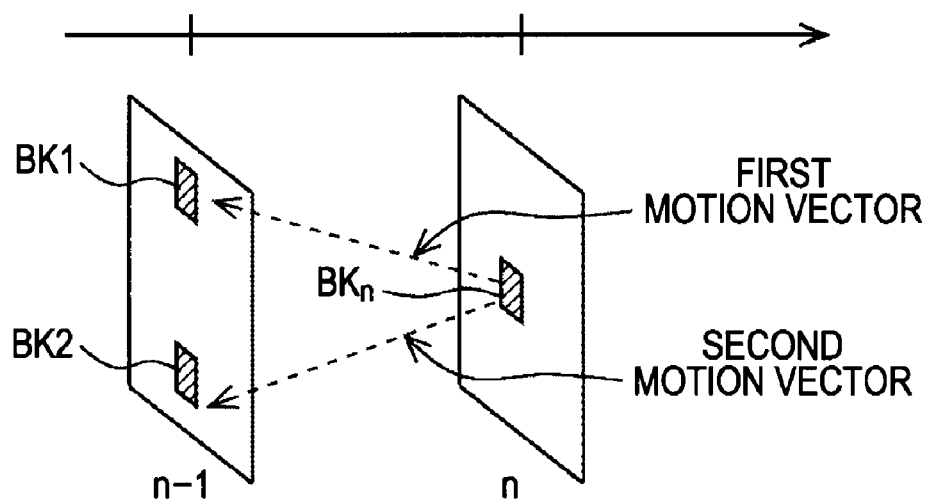

The (n) to (n−1) motion estimation unit 4 calculates the correlation between a target block $BK_n$ and the blocks indicated by the first and second motion vectors of the target block $BK_n$. Herein, the (n) to (n−1) motion estimation unit 4 handles, as the first and second motion vectors, the vectors in the opposite directions to the first and second motion vectors obtained by the candidate vector extraction unit 2. For example, the (n) to (n−1) motion estimation unit 4 calculates the difference absolute value sums between the target block $BK_n$ and blocks BK1 and BK2 in the reference frame n−1 indicated by the first and second motion vectors of the target block $BK_n$ in the reference frame n illustrated in FIG. 3B. FIG. 3B is a schematic diagram illustrating an operation example of the (n) to (n−1) motion estimation unit 4. The (n) to (n−1) motion estimation unit 4 selects the motion vector corresponding to the smaller difference absolute value sum. Herein, similarly to the above example, in an uncovered background area (hereinafter referred to as an uncovered area) in the reference frame n illustrated in FIG. 4, a pixel for which the motion vector is to be obtained is absent. Therefore, a correct motion vector is not obtained. Herein, an uncovered area refers to an area appearing along with the motion of the foreground (object).

Figure 4:
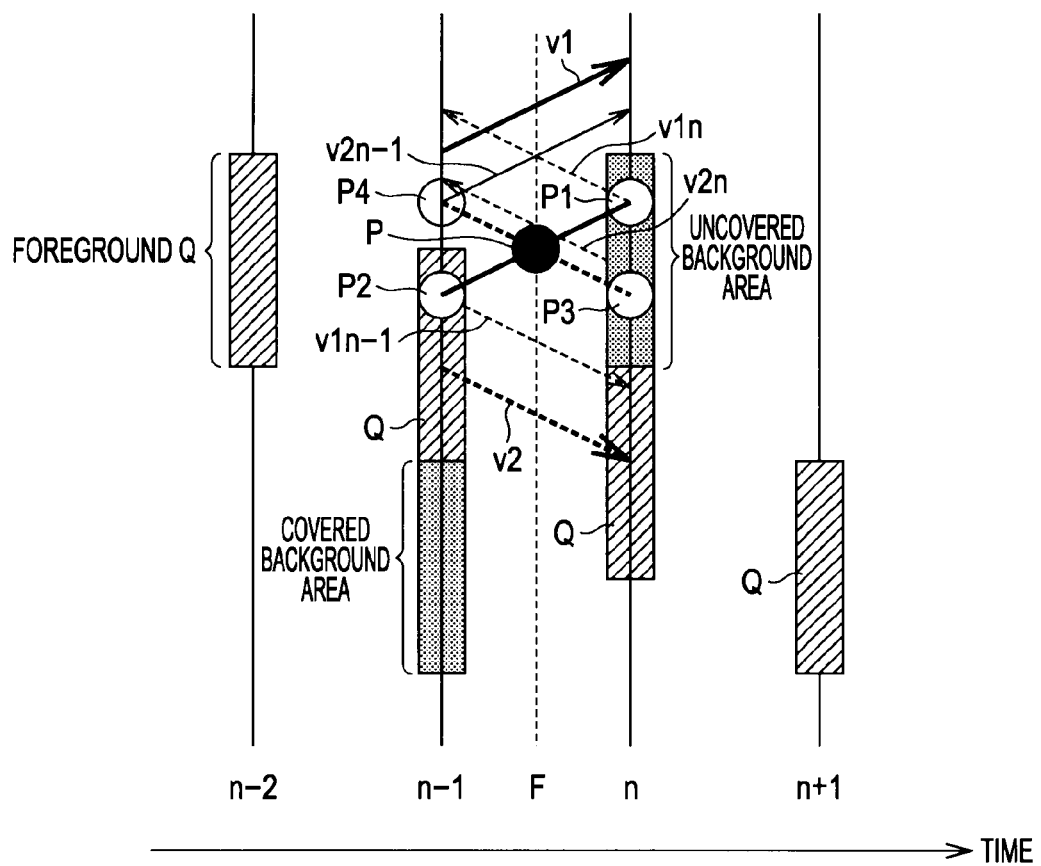
FIG. 4 is a schematic diagram illustrating a method (first method) of obtaining the motion vector of a generated pixel in the interpolated frame by using a generated pixel motion estimation unit.

The generated pixel motion estimation unit 5 illustrated in FIG. 1 obtains the motion vector of the generated pixel P in the interpolated frame F illustrated in FIG. 4. In the present example, the following four states of (1) to (4) for drawing a pixel are distinguished. In the state of (1), a pixel is drawn from the reference frames n and n−1 in accordance with the first motion vector. In the state of (2), a pixel is drawn from the reference frames n and n−1 in accordance with the second motion vector. In the state of (3), a pixel is drawn only from the reference frame n (uncovered area) in accordance with the first motion vector. In the state of (4), a pixel is drawn only from the reference frame n−1 (covered area) in accordance with the second motion vector. A method of distinguishing the above states of (1) to (4) will be described in detail with reference to FIGS. 4 to 6. The generated pixel motion estimation unit 5 outputs the motion vector of the generated pixel P in the interpolated frame F illustrated in FIG. 4 to the frame interpolation unit 6. On the basis of the motion vector output from the generated pixel motion estimation unit 5, the frame interpolation unit 6 draws a pixel from the reference frames n−1 and n to generate the generated pixel P in the interpolated frame F.

Figure 5:
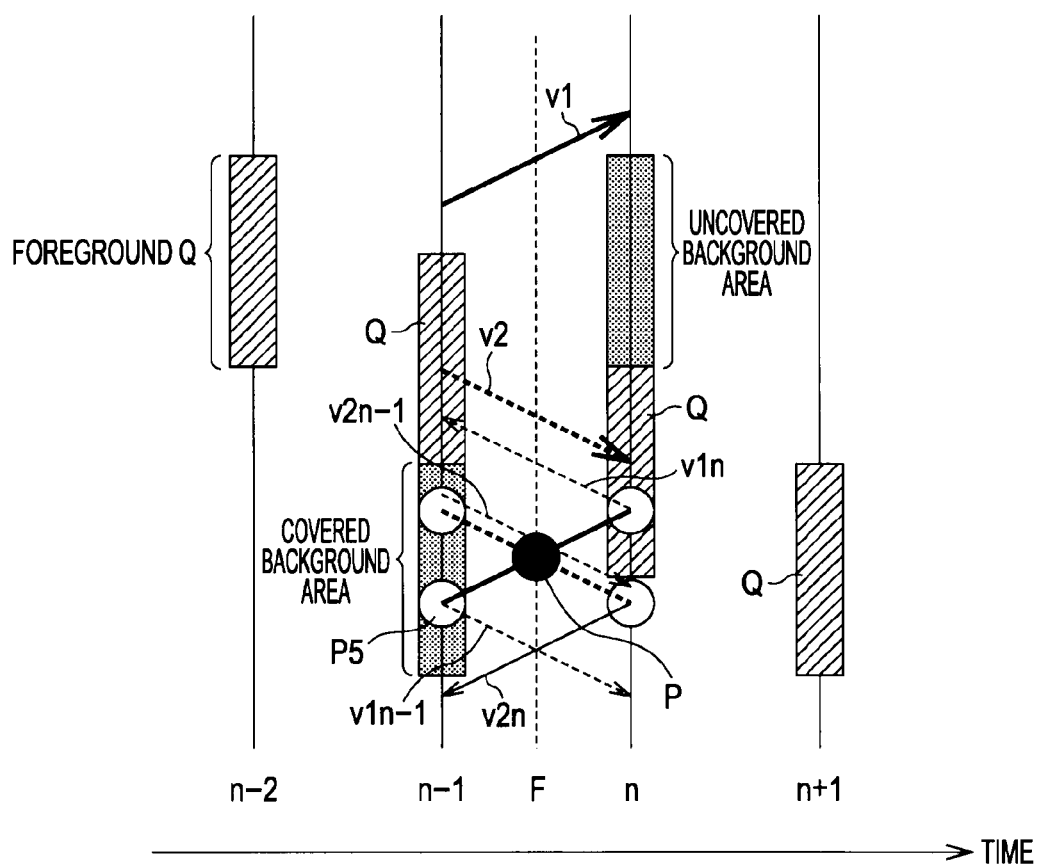
FIG. 5 is a schematic diagram illustrating a method (second method) of obtaining the motion vector of the generated pixel in the interpolated frame by using the generated pixel motion estimation unit.

Subsequently, a method of obtaining the motion vector of the generated pixel P in the interpolated frame F will be described. FIGS. 4 and 5 are schematic diagrams illustrating a method of obtaining the motion vector of the generated pixel P in the interpolated frame F by using the generated pixel motion estimation unit 5. A motion vector v1 illustrated in FIGS. 4 and 5 represents the first motion vector. The motion vector mainly represents the background motion obtained from, for example, the histogram in a peripheral area or the entire screen of the block matching result. A motion vector v2 represents the second motion vector. The motion vector mainly represents the foreground motion obtained as, for example, the largest local maximum value excluding the value corresponding to the motion vector v1 in the histogram in a peripheral area of the block matching result in the peripheral area.

The generated pixel motion estimation unit 5 translates the first motion vector v1 and the second motion vector v2 to pass through the position of the generated pixel P in the interpolated frame F provided between the reference frames n−1 and n. Then, the generated pixel motion estimation unit 5 sets local areas at four points of the start points and the end points of the translated first and second motion vectors v1 and v2 to be search areas, and identifies from the search areas the motion vector estimated by the motion estimation units 3 and 4.

The generated pixel motion estimation unit 5 first translates the motion vector v1 to pass through the position of the generated pixel P in the interpolated frame F, and refers to the motion vectors at the start point and the end point of the motion vector v1 passing through the position of the generated pixel P. For example, a motion vector obtained to extend from the reference frame n−1 as the start point toward the reference frame n as the end point is determined to be a motion vector v1$n$−1, and a motion vector obtained to extend from the reference frame n toward the reference frame n−1 is determined to be a motion vector vin.

Further, the generated pixel motion estimation unit 5 translates the motion vector v2 to pass through the position of the generated pixel P in the interpolated frame F, and refers to the motion vectors at the start point and the end point of the motion vector v2 passing through the position of the generated pixel P. For example, a motion vector obtained to extend from the reference frame n−1 as the start point toward the reference frame n as the end point is determined to be a motion vector v2$n$−1, and a motion vector obtained to extend from the reference frame n toward the reference frame n−1 is determined to be a motion vector v2$n$. With the use of these motion vectors v1$n$−1, v1$n$, v2$n$−1, and v2$n$, the motion vector of the generated pixel P in the interpolated frame F is obtained.

Figure 6:
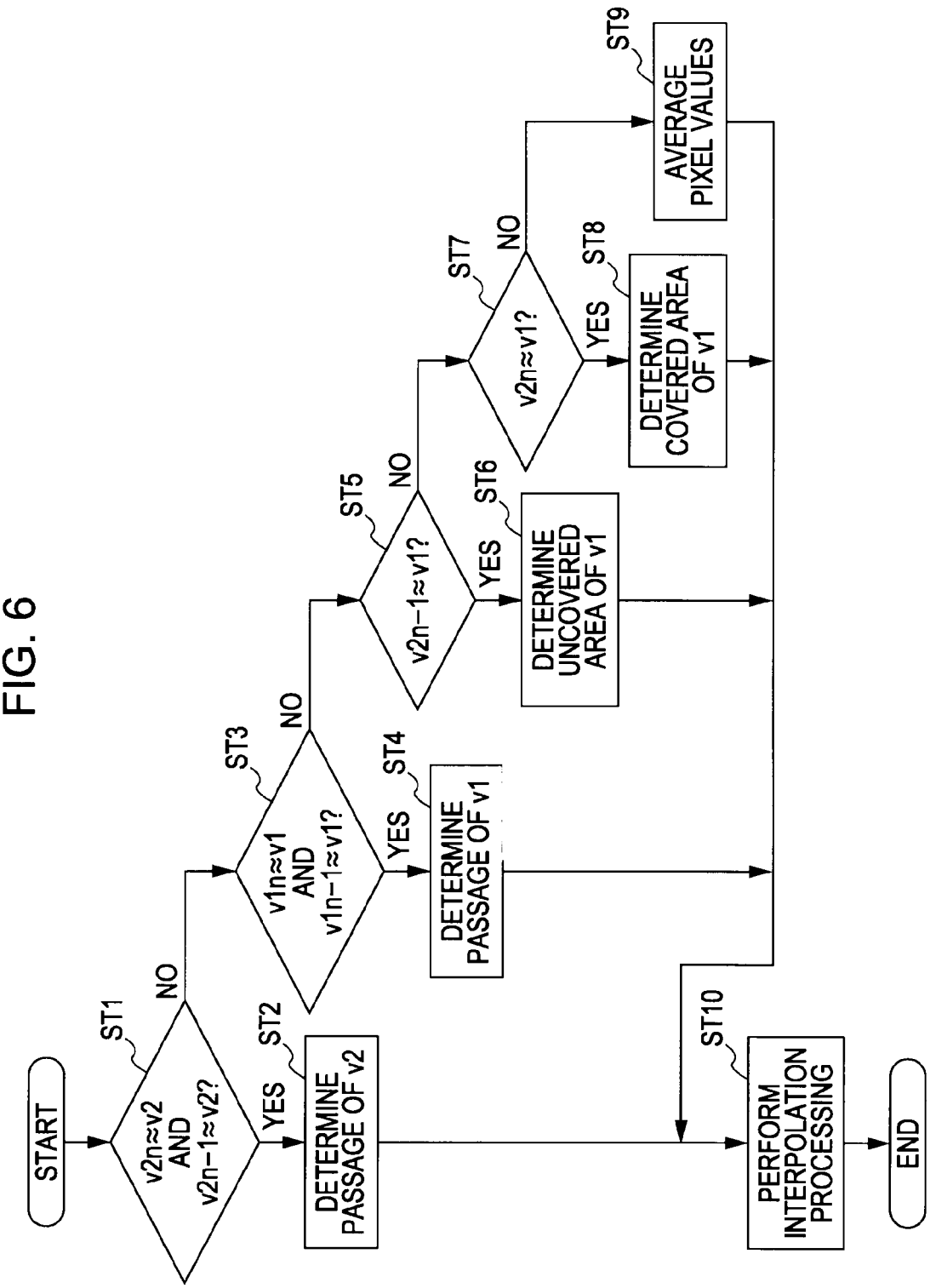
FIG. 6 is a flowchart illustrating an operation example (first example) of the generated pixel motion estimation unit.

Subsequently, how to obtain the motion vector of the generated pixel P in the interpolated frame F will be described. FIG. 6 is a flowchart illustrating an operation example (first example) of the generated pixel motion estimation unit 5. At Step ST1 shown in FIG. 6, the generated pixel motion estimation unit 5 determines whether or not the motion vectors v2$n$ and v2 illustrated in FIG. 4 are substantially equal to each other, and whether or not the motion vectors v2$n$−1 and v2 are substantially equal to each other. That is, when the second motion vector v2 representing the motion of a foreground Q has been translated to the position at which the second motion vector v2 passes through the generated pixel P, the generated pixel motion estimation unit 5 determines whether or not the motion vector v2$n$−1 on the reference frame n−1 and the motion vector v2$n$ on the reference frame n are substantially equal to the second motion vector v2. If the generated pixel motion estimation unit 5 determines that the motion vectors v2$n$−1 and v2$n$ are substantially equal to the second motion vector v2, the processing proceeds to Step ST2.

Figure 8A:
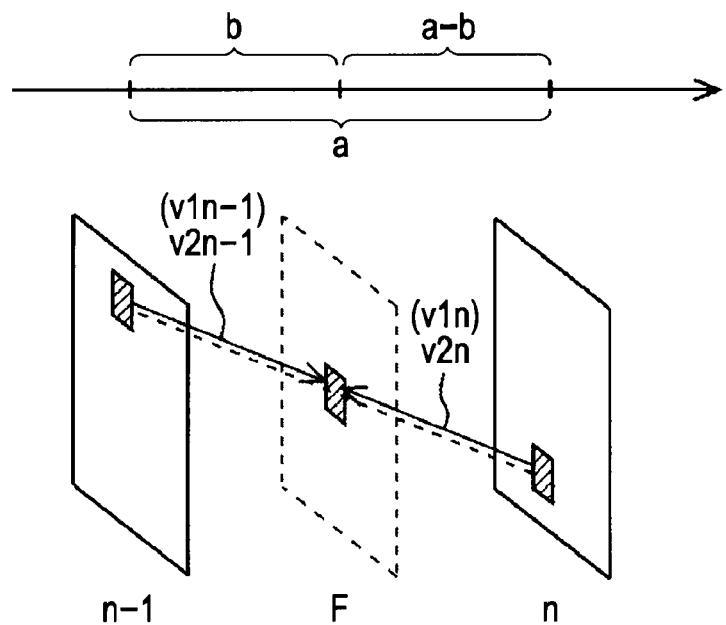
FIGS. 8A and 8B are schematic diagrams each illustrating a frame rate conversion method.

At Step ST2, the generated pixel motion estimation unit 5 determines that the second motion vector v2 passes through the generated pixel P in the interpolated frame F. Then, on the basis of the second motion vector v2, the generated pixel motion estimation unit 5 obtains motion vectors for drawing pixels P3 and P4 on the reference frames n and n−1 as the generated pixel P. As illustrated in FIG. 8A, the motion vector v2$n$−1 obtained by the (n−1) to (n) motion estimation unit 3 is set to have a distance ratio of b/a. Further, the motion vector v2$n$ obtained by the (n) to (n−1) motion estimation unit 4 is set to have a distance ratio of (a−b)/a. For example, if the interpolated frame F is located at an intermediate position between the reference frames n−1 and n, the magnitude of the motion vector v2$n$ is halved, and the magnitude of the motion vector v2$n$−1 is halved. FIG. 8A is a schematic diagram illustrating a frame rate conversion method performed in an area other than the covered and uncovered areas. The distance ratios between the interpolated frame F and the reference frames n−1 and n illustrated in FIG. 8A are expressed with the use of the values a and b. Then, the processing proceeds to Step ST10.

At Step ST10, the frame interpolation unit 6 performs motion compensation on the pixels P3 and P4 on the basis of the motion vectors v2$n$ and v2$n$−1 obtained by the motion estimation unit 5, adds together the pixel values of the pixels P3 and P4, and averages the resultant sum to obtain the generated pixel P.

Meanwhile, if the generated pixel motion estimation unit 5 determines at the above-described Step ST1 that the motion vectors v2$n$−1 and v2$n$ are not equal to the second motion vector v2, the processing proceeds to Step ST3. At Step ST3, the generated pixel motion estimation unit 5 determines whether or not the motion vectors v1$n$ and v1 are substantially equal to each other, and whether or not the motion vectors v1$n$−1 and v1 are substantially equal to each other. That is, when the first motion vector v1 representing the motion of the background has been translated to the position at which the first motion vector v1 passes through the generated pixel P, the generated pixel motion estimation unit 5 determines whether or not the motion vector v1$n$−1 on the reference frame n−1 and the motion vector v1$n$ on the reference frame n are substantially equal to the first motion vector v1. If the generated pixel motion estimation unit 5 determines that the motion vectors v1$n$−1 and v1$n$ are substantially equal to the first motion vector v1, the processing proceeds to Step ST4.

At Step ST4, the generated pixel motion estimation unit 5 determines that the first motion vector v1 passes through the generated pixel P in the interpolated frame F. Then, on the basis of the first motion vector v1, the generated pixel motion estimation unit 5 obtains motion vectors for drawing pixels P1 and P2 on the reference frames n and n−1 as the generated pixel P. As illustrated in FIG. 8A, the motion vector v1$n$−1 obtained by the (n−1) to (n) motion estimation unit 3 is set to have a distance ratio of b/a. Further, the motion vector v1$n$ obtained by the (n) to (n−1) motion estimation unit 4 is set to have a distance ratio of (a−b)/a. For example, if the interpolated frame F is located at an intermediate position between the reference frames n−1 and n, the magnitude of the motion vector vin is halved, and the magnitude of the motion vector v1$n$−1 is halved. Then, the processing proceeds to Step ST10.

At Step ST10, the frame interpolation unit 6 performs motion compensation on the pixels P1 and P2 on the basis of the motion vectors v1$n$ and v1$n$−1 obtained by the motion estimation unit 5, adds together the pixel values of the pixels P1 and P2, and averages the resultant sum to obtain the generated pixel P.

Meanwhile, if the generated pixel motion estimation unit 5 determines at the above-described Step ST3 that the motion vectors v1$n$−1 and v1$n$ are not equal to the first motion vector v1, the processing proceeds to Step ST5. At Step ST5, the generated pixel motion estimation unit 5 determines whether or not the motion vector v2$n$−1 and the first motion vector v1 are substantially equal to each other. That is, when the second motion vector v2 representing the motion of the foreground Q has been translated to the position at which the second motion vector v2 passes through the generated pixel P, the generated pixel motion estimation unit 5 determines whether or not the motion vector v2$n$−1 on the reference frame n−1 is substantially equal to the first motion vector v1. If the generated pixel motion estimation unit 5 determines that the motion vector v2$n$−1 is substantially equal to the first motion vector v1, the processing proceeds to Step ST6.

Figure 8B:
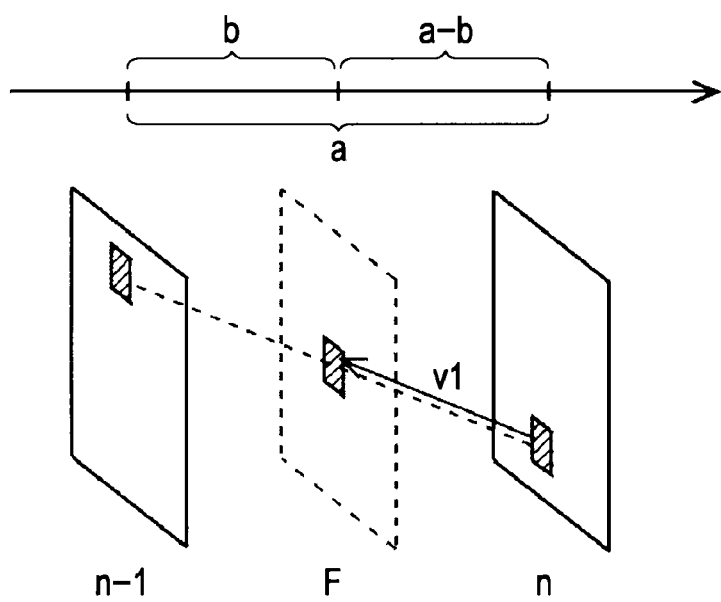

At Step ST6, the generated pixel motion estimation unit 5 determines the uncovered area. Then, on the basis of the first motion vector v1, the generated pixel motion estimation unit 5 obtains a motion vector for drawing the pixel P1 on the reference frame n as the generated pixel P. As illustrated in FIG. 8B, the motion vector v1 obtained by the (n) to (n−1) motion estimation unit 4 is set to have a distance ratio of (a−b)/a. For example, if the interpolated frame F is located at an intermediate position between the reference frames n−1 and n, the magnitude of the first motion vector v1 is halved. FIG. 8B is a schematic diagram illustrating a frame rate conversion method performed in the covered and uncovered areas. Then, the processing proceeds to Step ST10.

At Step ST10, the frame interpolation unit 6 determines the pixel value of the generated pixel P to be the pixel value of the pixel P1 subjected to the motion compensation performed on the basis of the motion vector v1 obtained by the motion estimation unit 5.

Meanwhile, if the generated pixel motion estimation unit 5 determines at the above-described Step ST5 that the motion vector v2n−1 is not equal to the first motion vector v1, the processing proceeds to Step ST7. At Step ST7, the generated pixel motion estimation unit 5 determines whether or not the motion vector v2n and the first motion vector v1 are substantially equal to each other. That is, when the second motion vector v2 representing the motion of the foreground Q has been translated to the position at which the second motion vector v2 passes through the generated pixel P, the generated pixel motion estimation unit 5 determines whether or not the motion vector v2n on the reference frame n is substantially equal to the first motion vector v1. If the generated pixel motion estimation unit 5 determines that the motion vector v2n is substantially equal to the first motion vector v1, as illustrated in FIG. 5, the processing proceeds to Step ST8.

At Step ST8, the generated pixel motion estimation unit 5 determines the covered area. Then, on the basis of the first motion vector v1, the generated pixel motion estimation unit 5 obtains a motion vector for drawing a pixel P5 on the reference frame n−1 illustrated in FIG. 5 as the generated pixel P. For example, if the interpolated frame F is located at an intermediate position between the reference frames n−1 and n, the magnitude of the first motion vector v1 is halved. Then, the processing proceeds to Step ST10. At Step ST10, the frame interpolation unit 6 determines the pixel value of the generated pixel P to be the pixel value of the pixel P5 subjected to the motion compensation performed on the basis of the motion vector v1 obtained by the motion estimation unit 5.

Meanwhile, if the generated pixel motion estimation unit 5 determines at the above-described Step ST7 that the motion vector v2n illustrated in FIG. 5 is not equal to the first motion vector v1, the processing proceeds to Step ST9. At Step ST9, which does not correspond to any of the above-described four states (1) to (4), the generated pixel motion estimation unit 5 selects, for example, the pixels at the same position as the generated pixel P and peripheral pixels thereof from the reference frames n−1 and n, and averages the pixel values of the selected pixels to obtain the generated pixel P. Another calculation method may also be employed, of course.

The flowchart illustrated in FIG. 6 is not limited thereto. For example, therefore, the determination at Step ST1 and the determination at Step ST3 may be switched. That is, the determination at Step ST3 may precede the determination at Step ST1. Similarly, the determination at Step ST5 and the determination at Step ST7 may be switched. That is, the determination at Step ST7 may precede the determination at Step ST5.

Figure 7:
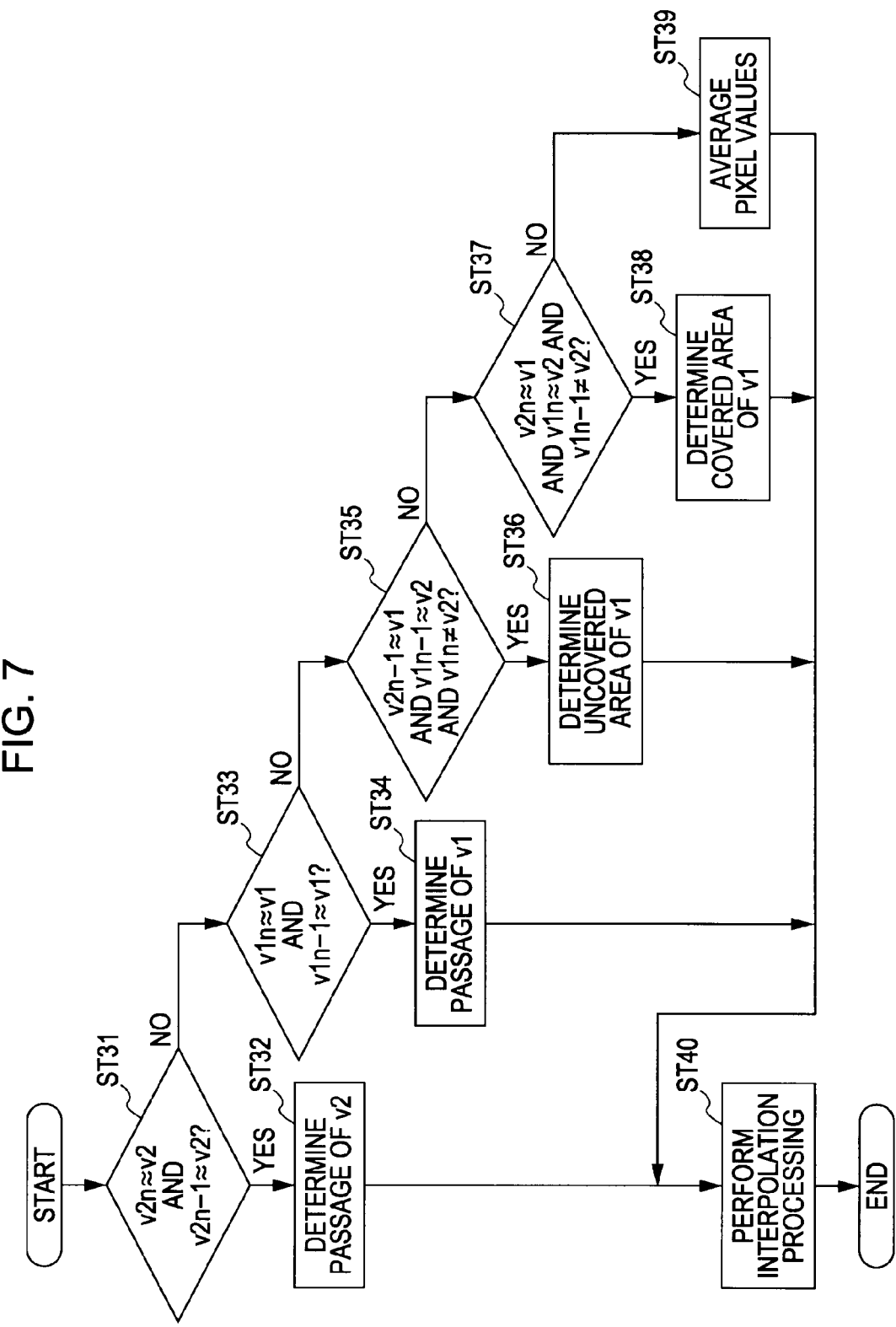
FIG. 7 is a flowchart illustrating an operation example (second example) of the generated pixel motion estimation unit.

FIG. 7 is a flowchart illustrating an operation example (second example) of the generated pixel motion estimation unit 5. In the present example, additional determination conditions are set to perform the determination of the covered and uncovered areas with higher accuracy than in the flowchart illustrated in FIG. 6.

The processes at Steps ST31 and ST33 shown in FIG. 7 are the same as the processes at the above-described Steps ST1 and ST3. At Step ST35, when the second motion vector v2 representing the motion of the foreground Q has been translated to the position at which the second motion vector v2 passes through the generated pixel P, the generated pixel motion estimation unit 5 determines whether or not the motion vector v2n−1 on the reference frame n−1 and the first motion vector v1 are substantially equal to each other. Further, the generated pixel motion estimation unit 5 determines whether or not the motion vector v1n−1 and the second motion vector v2 of the foreground Q are substantially equal to each other. Thereby, the correspondence of the motion of the foreground Q to the second motion vector v2 can be determined. Accordingly, the uncovered area can be clarified. Further, the generated pixel motion estimation unit 5 determines whether or not the motion vector v1n on the reference frame n and the second motion vector v2 are unequal to each other. If three conditions described above are met, the processing proceeds to Step ST36.

Further, at Step ST37, when the second motion vector v2 representing the motion of the foreground Q has been translated to the position at which the second motion vector v2 passes through the generated pixel P, the generated pixel motion estimation unit 5 determines whether or not the motion vector v2n on the reference frame n and the first motion vector v1 are substantially equal to each other. Further, the generated pixel motion estimation unit 5 determines whether or not the motion vector v1n and the second motion vector v2 of the foreground Q are substantially equal to each other. Thereby, the correspondence of the motion of the foreground Q to the second motion vector v2 can be determined. Accordingly, the covered area can be clarified. Further, the generated pixel motion estimation unit 5 determines whether or not the motion vector v1n−1 on the reference frame n−1 and the second motion vector v2 are unequal to each other. If three conditions described above are met, the processing proceeds to Step ST38.

Steps ST32, ST34, ST36, ST38, ST39, and ST40 shown in FIG. 7 correspond to the corresponding steps in the flowchart illustrated in FIG. 6. With this addition of the conditions for determining the covered and uncovered areas, the covered and uncovered areas can be accurately determined.

FIG. 9 is a flowchart illustrating an operation example of the frame interpolation device 100. At Step ST51 shown in FIG. 9, the motion vector detection unit 1 illustrated in FIG. 1 detects motion vectors in block units of approximately 8 by 8 pixels, for example, and in accordance with the block matching method. Then, the processing proceeds to Step ST52.

At Step ST52, the candidate vector extraction unit 2 converts the data of all motion vectors obtained by the motion vector detection unit 1 into a histogram, and determines a motion vector indicating the maximum value of the histogram to be a background vector representing the motion of the background. The candidate vector extraction unit 2 converts the motion vectors of the periphery of the target block $BK_{n-1}$ (see FIG. 3A, for example) including the generated pixel into a histogram, and obtains a motion vector indicating the maximum value of the histogram and a motion vector indicating the second local maximum value, for example. The candidate vector extraction unit 2 obtains the candidate vectors of the above-described target block $BK_{n-1}$ by determining a motion vector close to the previously obtained background vector to be the first motion vector and a motion vector far from the background vector to be the second motion vector. Then, the processing proceeds to Step ST53.

At Step ST53, the (n−1) to (n) motion estimation unit 3 identifies the motion vectors in pixel units between the reference frames n−1 and n. For example, the (n−1) to (n) motion estimation unit 3 calculates the difference absolute value sums between the target block $BK_{n-1}$ and the blocks BK1 and BK2 in the reference frame n indicated by the first and second motion vectors of the target block $BK_{n-1}$ in the reference frame n−1. Then, the (n−1) to (n) motion estimation unit 3 identifies the motion vector corresponding to the smaller difference absolute value sum. Then, the processing proceeds to Step ST54.

At Step ST54, the (n) to (n−1) motion estimation unit 4 identifies the motion vectors in pixel units between the reference frames n and n−1. For example, the (n) to (n−1) motion estimation unit 4 calculates the difference absolute value sums between the target block $BK_n$ and the blocks BK1 and BK2 in the reference frame n−1 indicated by the first and second motion vectors of the target block $BK_n$ in the reference frame n. Then, the (n) to (n−1) motion estimation unit 4 identifies the motion vector corresponding to the smaller difference absolute value sum. Then, the processing proceeds to Step ST55.

At Step ST55, the generated pixel motion estimation unit 5 performs the covered/uncovered (C/UC) determination (see FIGS. 4 to 6) by drawing the identification results of the motion vectors in the reference frames n and n−1 at the position of the generated pixel P. Then, the processing proceeds to Step ST56.

At Step ST56, the frame interpolation unit 6 generates the generated pixel P in the interpolated frame F by drawing a pixel from the reference frames n−1 and n on the basis of the motion vector output from the generated pixel motion estimation unit 5. Then, the processing proceeds to Step ST57. At Step ST57, whether or not the input image signal (moving image signal) Din has been completed is determined. If the input image signal Din has not been completed, the processing returns to Step ST51. If the input image signal (moving image signal) Din has been completed, the processing is completed.

As described above, the frame interpolation device 100 and the frame interpolation method as the first embodiment translate the first motion vector v1 and the second motion vector v2 to pass through the position of the generated pixel P in the interpolated frame F, set the local areas at four points of the start points and the end points of the translated first and second motion vectors v1 and v2 to be the search areas, and identify the first or second motion vector from the search areas.

With this configuration, it is possible to prevent an issue of the generation of a gap with no image data and a portion with overlapping image data in the interpolated frame F. It is also possible to reduce the possibility of selecting an incorrect motion vector, and to achieve correct frame interpolation in the covered background area and the uncovered background area by using two reference frames, i.e., a small number of reference frames.

Figure 10:
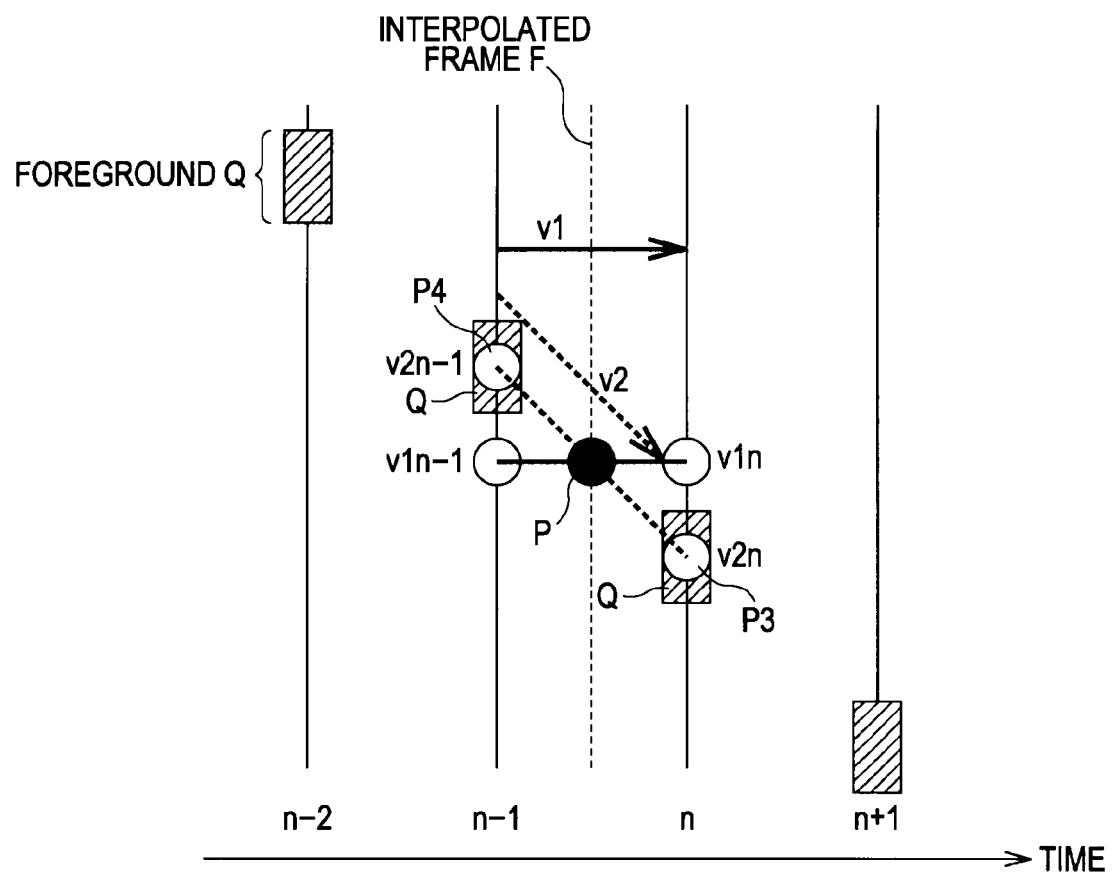
FIG. 10 is a schematic diagram illustrating an example of pass-through phenomenon in which both first and second motion vectors are determined to pass through the generated pixel.

FIG. 10 illustrates a so-called pass-through phenomenon in which both the first motion vector v1 and the second motion vector v2 are determined to pass through the generated pixel P. For example, in an image with little motion blur, such as subtitles, and an image obtained with the release of a high-speed shutter, in which a small object passes at high speed, both the first motion vector v1 and the second motion vector v2 can be determined to pass through the generated pixel P in some cases, as illustrated in FIG. 10. In some cases, the selection of an incorrect motion results in significant deterioration of the interpolated image. In this case, the deterioration is generally reduced by placing priority on the object motion. Thus, it is desirable to place priority on the object motion. In the flowcharts illustrated in FIGS. 6 and 7, therefore, priority is given to the determination of the second motion vector v2 representing the object motion. Accordingly, in the pass-through phenomenon, the motion vectors v2n−1 and v2n are determined to be substantially equal to the second motion vector v2 at Step ST1 shown in FIG. 6, and the processing proceeds to Step ST2. At Step ST2, the second motion vector v2 is determined to pass through the generated pixel P in the interpolated frame F. Then, on the basis of the second motion vector v2, the pixels P3 and P4 on the reference frames n and n−1 are drawn as the generated pixel P.

In the above description, the first motion vector and the second motion vector are used to estimate the motion of the generated pixel P. In an embodiment illustrated in FIGS. 11 and 12, description will be made of an example in which the motion of the generated pixel P is estimated with the use of the first to third motion vectors.

Figure 11:
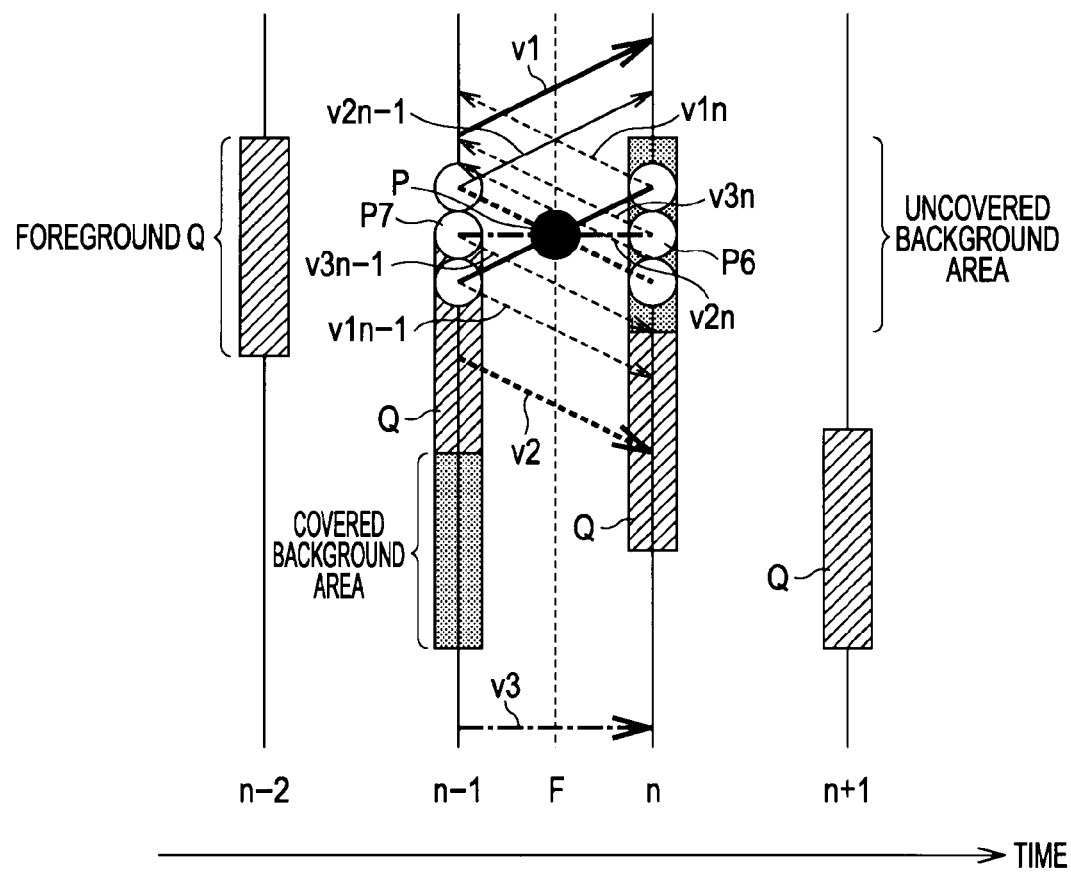
FIG. 11 is a schematic diagram illustrating a method (third method) of obtaining the motion vector of the generated pixel in the interpolated frame by using the generated pixel motion estimation unit.

FIG. 11 is a schematic diagram illustrating a method of obtaining the motion vector of the generated pixel P in the interpolated frame F by using the generated pixel motion estimation unit 5. The first motion vector v1 illustrated in FIG. 11 indicates a motion vector value mainly representing the background motion obtained from, for example, the histogram in a peripheral area or the entire screen of the block matching result. The second motion vector v2 is obtained as, for example, the largest local maximum value excluding the value corresponding to the motion vector v1 in the histogram in a peripheral area of the block matching result in the peripheral area. As a third motion vector v3, the third local maximum value in the histogram or a stationary vector is used.

Then, the motion vector v1 is translated to pass through the position of the generated pixel P in the interpolated frame F illustrated in FIG. 11. With reference to the motion vectors at the start point and the end point of the translated motion vector v1, the motion vectors v1n−1 and v1n are obtained. Further, the motion vector v2 is translated to pass through the position of the generated pixel P. With reference to the motion vectors at the start point and the end point of the translated motion vector v2, the motion vectors v2n−1 and v2n are obtained. Further, the motion vector v3 is translated to pass through the position of the generated pixel P. With reference to the motion vectors at the start point and the end point of the translated motion vector v3, motion vectors v3n−1 and v3n are obtained.

Figure 12:
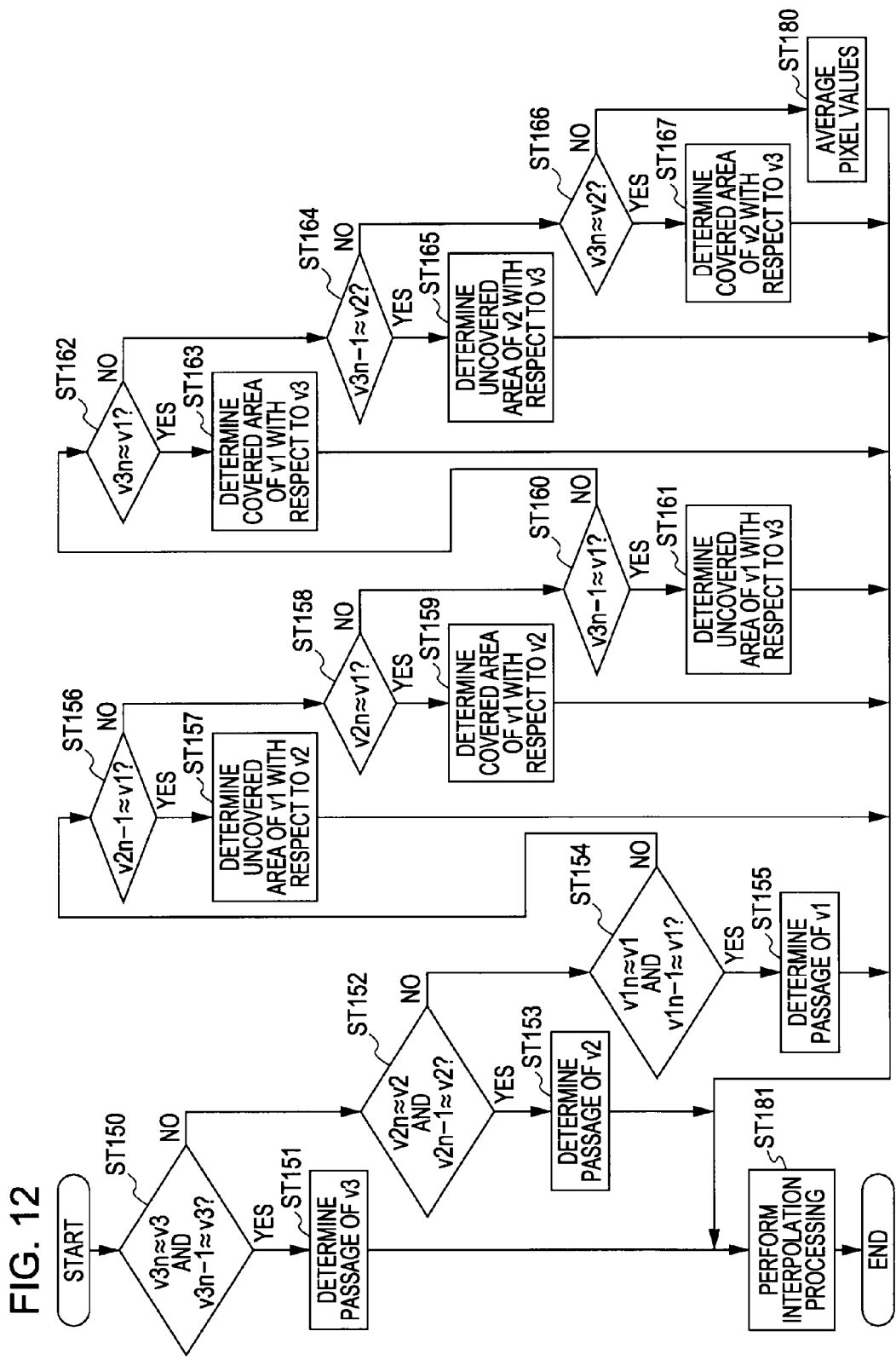
FIG. 12 is a flowchart illustrating an operation example (third example) of the generated pixel motion estimation unit.

Subsequently, description will be made of how to obtain the motion vector of the generated pixel P in the interpolated frame F on the basis of the first motion vector v1 to the third motion vector v3. FIG. 12 is a flowchart illustrating an operation example (third example) of the generated pixel motion estimation unit 5. At Step ST150 shown in FIG. 12, the generated pixel motion estimation unit 5 determines whether or not the motion vectors v3n and v3 illustrated in FIG. 11 are substantially equal to each other, and whether or not the motion vectors v3n−1 and v3 are substantially equal to each other. That is, when the third motion vector v3 representing, for example, the stationary state has been translated to the position at which the third motion vector v3 passes through the generated pixel P, the generated pixel motion estimation unit 5 determines whether or not the motion vector v3n−1 on the reference frame n−1 and the motion vector v3$n$ on the reference frame n are substantially equal to the third motion vector v3. If the generated pixel motion estimation unit 5 determines that the motion vectors v3$n$−1 and v3$n$ are substantially equal to the third motion vector v3, the processing proceeds to Step ST151.

At Step ST151, the generated pixel motion estimation unit 5 determines that the third motion vector v3 passes through the generated pixel P in the interpolated frame F. Then, on the basis of the third motion vector v3, the generated pixel motion estimation unit 5 obtains motion vectors for drawing pixels P6 and P7 on the reference frames n and n−1 as the generated pixel P. Then, the processing proceeds to Step ST181.

At Step ST181, the frame interpolation unit 6 adds together the pixel values of the pixels P6 and P7 subjected to the motion compensation performed on the basis of the motion vectors obtained by the motion estimation unit 5, and averages the resultant sum to obtain the generated pixel P.

Meanwhile, if the generated pixel motion estimation unit 5 determines at the above-described Step ST150 that the motion vectors v3$n$−1 and v3$n$ are not equal to the third motion vector v3, the processing proceeds to Step ST152. Steps ST152 to ST159 correspond to Steps ST1 to ST8 shown in FIG. 6. Thus, description thereof will be omitted.

At Step ST160, the generated pixel motion estimation unit 5 determines whether or not the motion vector v3$n$−1 and the first motion vector v1 are substantially equal to each other. That is, when the third motion vector v3 representing, for example, the stationary state has been translated to the position at which the third motion vector v3 passes through the generated pixel P, the generated pixel motion estimation unit 5 determines whether or not the motion vector v3$n$−1 on the reference frame n−1 is substantially equal to the first motion vector v1. If the generated pixel motion estimation unit 5 determines that the motion vector v3$n$−1 is substantially equal to the first motion vector v1, the processing proceeds to Step ST161.

At Step ST161, the generated pixel motion estimation unit 5 determines the uncovered area. Then, on the basis of the first motion vector v1, the generated pixel motion estimation unit 5 obtains a motion vector for drawing a pixel on the reference frame n as the generated pixel P. Then, the processing proceeds to Step ST181. At Step ST181, the frame interpolation unit 6 determines the pixel value of the generated pixel P to be the pixel value of the pixel subjected to the motion compensation performed on the basis of the motion vector v1 obtained by the motion estimation unit 5.

Meanwhile, if the generated pixel motion estimation unit 5 determines at the above-described Step ST160 that the motion vector v3$n$−1 is not equal to the first motion vector v1, the processing proceeds to Step ST162. At Step ST162, the generated pixel motion estimation unit 5 determines whether or not the motion vector v3$n$ and the first motion vector v1 are substantially equal to each other. That is, when the third motion vector v3 representing, for example, the stationary state has been translated to the position at which the third motion vector v3 passes through the generated pixel P, the generated pixel motion estimation unit 5 determines whether or not the motion vector v3$n$ on the reference frame n is substantially equal to the first motion vector v1. If the generated pixel motion estimation unit 5 determines that the motion vector v3$n$ on the reference frame n is substantially equal to the first motion vector v1, the processing proceeds to Step ST163.

At Step ST163, the generated pixel motion estimation unit 5 determines the covered area. Then, on the basis of the first motion vector v1, the generated pixel motion estimation unit 5 obtains a motion vector for drawing a pixel on the reference frame n−1 as the generated pixel P. For example, if the interpolated frame F is located at an intermediate position between the reference frames n−1 and n, the magnitude of the first motion vector v1 is halved. Then, the processing proceeds to Step ST181. At Step ST181, the frame interpolation unit 6 determines the pixel value of the generated pixel P to be the pixel value of the pixel subjected to the motion compensation performed on the basis of the motion vector v1 obtained by the motion estimation unit 5.

Meanwhile, if the generated pixel motion estimation unit 5 determines at the above-described Step ST162 that the motion vector v3$n$ is not equal to the first motion vector v1, the processing proceeds to Step ST164. At Step ST164, the generated pixel motion estimation unit 5 determines whether or not the motion vector v3$n$−1 and the second motion vector v2 are substantially equal to each other. That is, when the third motion vector v3 representing the stationary state has been translated to the position at which the third motion vector v3 passes through the generated pixel P, the generated pixel motion estimation unit 5 determines whether or not the motion vector v3$n$−1 on the reference frame n−1 is substantially equal to the second motion vector v2. If the generated pixel motion estimation unit 5 determines that the motion vector v3$n$−1 on the reference frame n−1 is substantially equal to the second motion vector v2, the processing proceeds to Step ST165.

At Step ST165, the generated pixel motion estimation unit 5 determines the uncovered area. Then, on the basis of the second motion vector v2, the generated pixel motion estimation unit 5 obtains a motion vector for drawing a pixel on the reference frame n as the generated pixel P. For example, if the interpolated frame F is located at an intermediate position between the reference frames n−1 and n, the magnitude of the first motion vector v1 is halved. Then, the processing proceeds to Step ST181. At Step ST181, the frame interpolation unit 6 determines the pixel value of the generated pixel P to be the pixel value of the pixel subjected to the motion compensation performed on the basis of the motion vector v2 obtained by the motion estimation unit 5.

Meanwhile, if the generated pixel motion estimation unit 5 determines at the above-described Step ST164 that the motion vector v3$n$−1 is not equal to the second motion vector v2, the processing proceeds to Step ST166. At Step ST166, the generated pixel motion estimation unit 5 determines whether or not the motion vector v3$n$ and the second motion vector v2 are substantially equal to each other. That is, when the third motion vector v3 representing the stationary state has been translated to the position at which the third motion vector v3 passes through the generated pixel P, the generated pixel motion estimation unit 5 determines whether or not the motion vector v3$n$ on the reference frame n is substantially equal to the second motion vector v2. If the generated pixel motion estimation unit 5 determines that the motion vector v3$n$ on the reference frame n is substantially equal to the second motion vector v2, the processing proceeds to Step ST167.

At Step ST167, the generated pixel motion estimation unit 5 determines the covered area. Then, on the basis of the second motion vector v2, the generated pixel motion estimation unit 5 obtains a motion vector for drawing a pixel on the reference frame n as the generated pixel P. For example, if the interpolated frame F is located at an intermediate position between the reference frames n−1 and n, the magnitude of the second motion vector v2 is halved. Then, the processing proceeds to Step ST181. At Step ST181, the frame interpolation unit 6 determines the pixel value of the generated pixel P to be the pixel value of the pixel subjected to the motion compensation performed on the basis of the motion vector v2 obtained by the motion estimation unit 5.

Meanwhile, if the generated pixel motion estimation unit 5 determines at the above-described Step ST166 that the motion vector v3n is not equal to the second motion vector v2, the processing proceeds to Step ST180. At Step ST180, the generated pixel motion estimation unit 5 selects, for example, the pixels at the same position as the generated pixel P and peripheral pixels thereof from the reference frames n−1 and n, and averages the pixel values of the selected pixels to obtain the generated pixel P. Another calculation method may also be employed, of course.

As described above, the motion compensation of the generated pixel P may be performed with the use of three candidates, i.e., the first to third motion vectors. It is, of course, also possible to increase the number of candidates to four or more, for example, to thereby reduce errors occurring when the motion vectors are not selected as the candidates.

Figure 13:
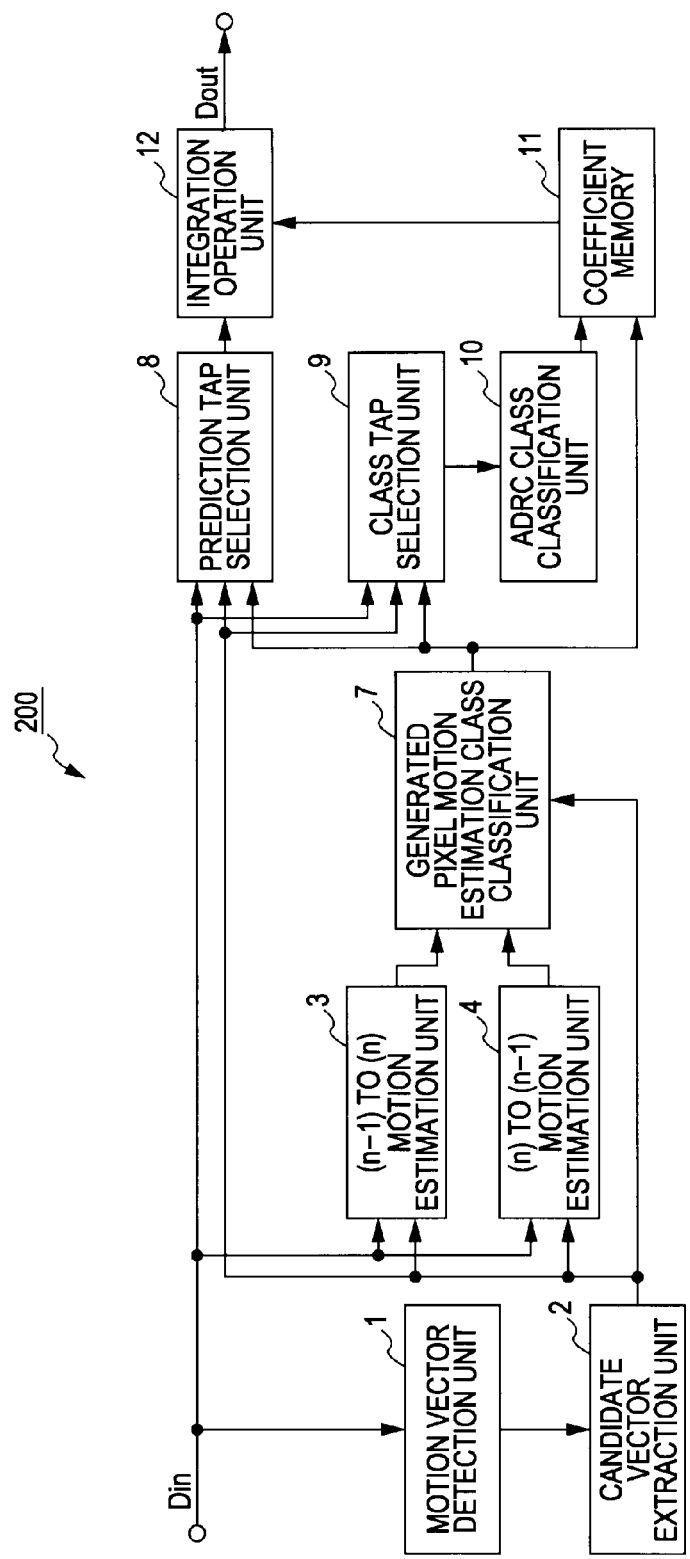
FIG. 13 is a block diagram illustrating a configuration example of a frame interpolation device as a second embodiment of the present invention.

Subsequently, description will be made of an example using class classification adaptation processing in the frame interpolation processing. FIG. 13 is a block diagram illustrating a configuration example of a frame interpolation device 200 as a second embodiment of the present invention. The frame interpolation device 200 illustrated in FIG. 13 performs, on the input image signal Din, shutter speed conversion and pixel mixture in the covered and uncovered areas, to thereby perform image signal processing enabling the display of a clear image by a device in which blurring occurs in a moving image, such as a liquid crystal display.

With the class classification adaptation processing performed in the shutter speed conversion, it is possible to obtain an output image signal Dout by converting the input image signal Din into a clearer image. That is, in the class classification adaptation processing, luminance level distribution and motion estimation class classification of the input image signal Din are performed. Further, a prediction operation is performed with the use of coefficient data previously acquired by learning and stored for each class. Accordingly, an optimal estimate is obtained, and an image is improved into a clearer image with less motion blur.

The frame interpolation device 200 illustrated in FIG. 13 includes the motion vector detection unit 1, the candidate vector extraction unit 2, the (n−1) to (n) motion estimation unit 3, the (n) to (n−1) motion estimation unit 4, a generated pixel motion estimation class classification unit 7, a prediction tap selection unit 8, a class tap selection unit 9, an ADRC (Adaptive Dynamic Range Coding) class classification unit 10, a coefficient memory 11, and an integration operation unit 12. The same components as the components of the above-described frame interpolation device 100 are assigned with the same reference numerals, and detailed description thereof will be omitted.

The motion vector detection unit 1 illustrated in FIG. 13 obtains motion vectors in block units of approximately 8 by 8 pixels commonly used in the block matching method, the gradient method, and so forth. The motion vectors obtained here are temporarily stored in a not-illustrated memory.

The candidate vector extraction unit 2 converts the data of all motion vectors obtained by the motion vector detection unit 1 into a histogram to obtain the background motion. Then, the candidate vector extraction unit 2 obtains, as the candidate vectors of the target block $BK_{n-1}$, the first motion vector representing the motion of the background and the second motion vector representing the motion of the foreground such as an object, and outputs the obtained vectors to the (n−1) to (n) motion estimation unit 3 and the (n) to (n−1) motion estimation unit 4.

The (n−1) to (n) motion estimation unit 3 calculates the difference absolute value sums between the target block $BK_{n-1}$ and the blocks BK1 and BK2 in the reference frame n indicated by the first and second motion vectors of the target block $BK_{n-1}$ in the reference frame n−1. Then, the (n−1) to (n) motion estimation unit 3 identifies the motion vector corresponding to the smaller difference absolute value sum. Herein, in the covered area in the reference frame n−1 illustrated in FIG. 4, a pixel for which the motion vector is to be obtained is absent. Therefore, a correct motion vector is not obtained.

The (n) to (n−1) motion estimation unit 4 calculates the difference absolute value sums between the target block $BK_n$ and the blocks BK1 and BK2 in the reference frame n−1 indicated by the first and second motion vectors of the target block $BK_n$ in the reference frame n. Then, the (n) to (n−1) motion estimation unit 4 identifies the motion vector corresponding to the smaller difference absolute value sum. Herein, in the uncovered area in the reference frame n illustrated in FIG. 4, a pixel for which the motion vector is to be obtained is absent. Therefore, a correct motion vector is not obtained.

The generated pixel motion estimation class classification unit 7 obtains the motion vector of the generated pixel P in the interpolated frame F illustrated in FIG. 4 by performing the C/UC determination (see FIGS. 4 to 6). With the use of the motion vector obtained by the generated pixel motion estimation class classification unit 7, the subsequent class classification adaptation processing unit (the prediction tap selection unit 8, the class tap selection unit 9, the ADRC class classification unit 10, the coefficient memory 11, and the integration operation unit 12) generates the generated pixel P. Further, the prediction tap selection unit 8 and the class tap selection unit 9 select, from the reference frames n−1 and n illustrated in FIGS. 8A and 8B, the pixels subjected to the motion compensation (MC) with the distance ratios b/a and (a−b)/a.

On the basis of the result of determination of the covered and uncovered areas at the position of the generated pixel P, the motion estimation class classification unit 7 performs class classification and conversion into binary data. As another method, the motion estimation class classification unit 7 classifies the value of the difference between the first motion vector amount and the second motion vector amount into four classes, for example, and converts the value into binary data. Alternatively, the motion estimation class classification unit 7 classifies the absolute value of the second motion vector amount mainly representing the motion of the foreground into four classes, for example, and converts the value into binary data. The above binary data is used as one of class codes (address data) of the coefficient memory 11.

The prediction tap selection unit 8 outputs the selected pixels to the integration operation unit 12. Further, the class tap selection unit 9 outputs the selected pixels to the ADRC class classification unit 10. The ADRC class classification unit 10 is a device for converting a waveform feature quantity (level distribution) into binary data. In the present example, the ADRC class classification unit 10 converts the feature quantity into binary data by using 1-bit ADRC.

The binary data obtained by the ADRC class classification unit 10 and the binary data obtained by the motion estimation class classification unit 7 are added together to form the class codes of the coefficient memory 11. The coefficient memory 11 stores the coefficient data previously acquired by learning.

The integration operation unit 12 performs a product-sum operation of the coefficient data and the pixel values read by the prediction tap selection unit 8, to thereby obtain an output pixel.

Figure 14:
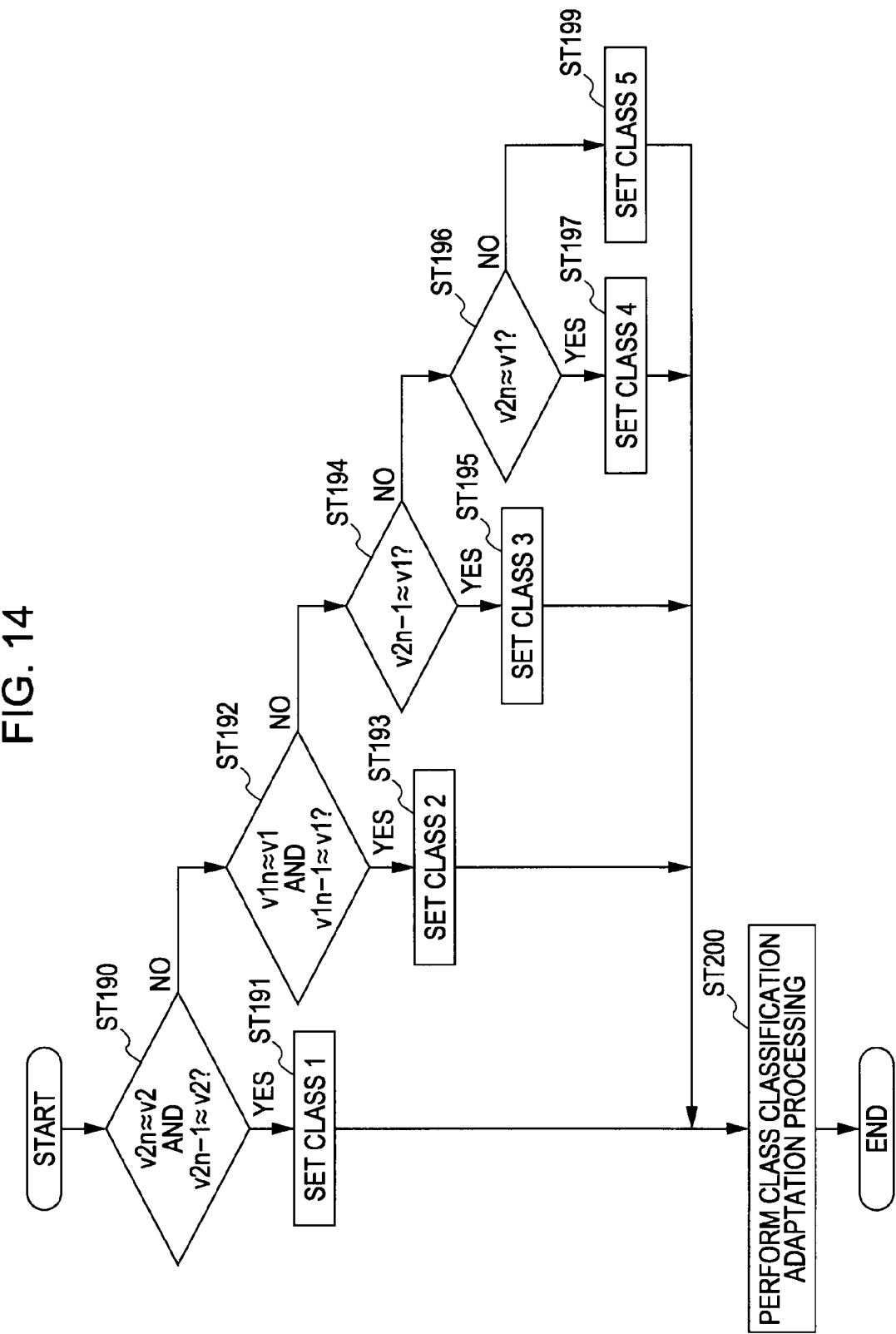
FIG. 14 is a flowchart illustrating an operation example of a motion estimation class classification unit.

Subsequently, description will be made of a method of obtaining the generated pixel P in the interpolated frame F by using the class classification adaptation processing. FIG. 14 is a flowchart illustrating an operation example of the motion estimation class classification unit 7. Steps ST190, ST192, ST194, and ST196 shown in FIG. 14 correspond to Steps ST1, ST3, ST5, and ST7 shown in FIG. 6. Thus, detailed description thereof will be omitted.

At Step ST190 shown in FIG. 14, the motion estimation class classification unit 7 determines whether or not the motion vectors v2n and v2 illustrated in FIG. 4 are substantially equal to each other, and whether or not the motion vectors v2n−1 and v2 are substantially equal to each other. If the motion estimation class classification unit 7 determines that the motion vectors v2n−1 and v2n are substantially equal to the second motion vector v2, the processing proceeds to Step ST191.

At Step ST191, the motion estimation class classification unit 7 determines that the second motion vector v2 passes through the generated pixel P in the interpolated frame F. Then, on the basis of the second motion vector v2, the motion estimation class classification unit 7 sets a class "1" as the class to be used in the class classification adaptation processing. Then, the processing proceeds to Step ST200.

At Step ST200, the class classification adaptation processing unit (the prediction tap selection unit 8, the class tap selection unit 9, the ADRC class classification unit 10, the coefficient memory 11, and the integration operation unit 12) generates the generated pixel P on the basis of the class "1" obtained by the motion estimation class classification unit 7.

Meanwhile, if the motion estimation class classification unit 7 determines at the above-described Step ST190 that the motion vectors v2n−1 and v2n are not equal to the second motion vector v2, the processing proceeds to Step ST192. At Step ST192, the motion estimation class classification unit 7 determines whether or not the motion vectors v1n and v1 are substantially equal to each other, and whether or not the motion vectors v1n−1 and v1 are substantially equal to each other. If the motion estimation class classification unit 7 determines that the motion vectors v1n−1 and v1n are substantially equal to the first motion vector v1, the processing proceeds to Step S193.

At Step ST193, the motion estimation class classification unit 7 determines that the first motion vector v1 passes through the generated pixel P in the interpolated frame F. Then, on the basis of the first motion vector v1, the motion estimation class classification unit 7 sets a class "2" as the class to be used in the class classification adaptation processing. Then, the processing proceeds to Step ST200.

At Step ST200, the class classification adaptation processing unit (the prediction tap selection unit 8, the class tap selection unit 9, the ADRC class classification unit 10, the coefficient memory 11, and the integration operation unit 12) generates the generated pixel P on the basis of the class "2" obtained by the motion estimation class classification unit 7.

Meanwhile, if the motion estimation class classification unit 7 determines at the above-described Step ST192 that the motion vectors v1n−1 and v1n are not equal to the first motion vector v1, the processing proceeds to Step ST194. At Step ST194, the motion estimation class classification unit 7 determines whether or not the motion vector v2n−1 and the first motion vector v1 are substantially equal to each other. If the motion estimation class classification unit 7 determines that the motion vector v2n−1 is substantially equal to the first motion vector v1, the processing proceeds to Step ST195.

At Step ST195, the motion estimation class classification unit 7 determines the uncovered area, and sets a class "3" as the class to be used in the class classification adaptation processing. Then, the processing proceeds to Step ST200.

At Step ST200, the class classification adaptation processing unit (the prediction tap selection unit 8, the class tap selection unit 9, the ADRC class classification unit 10, the coefficient memory 11, and the integration operation unit 12) generates the generated pixel P on the basis of the class "3" obtained by the motion estimation class classification unit 7.

Meanwhile, if the motion estimation class classification unit 7 determines at the above-described Step ST194 that the motion vector v2n−1 is not equal to the first motion vector v1, the processing proceeds to Step ST196. At Step ST196, the motion estimation class classification unit 7 determines whether or not the motion vector v2n and the first motion vector v1 are substantially equal to each other. If the motion estimation class classification unit 7 determines that the motion vector v2n is substantially equal to the first motion vector v1, the processing proceeds to Step ST197.

At Step ST197, the motion estimation class classification unit 7 determines the covered area, and sets a class "4" as the class to be used in the class classification adaptation processing. Then, the processing proceeds to Step ST200.

At Step ST200, the class classification adaptation processing unit (the prediction tap selection unit 8, the class tap selection unit 9, the ADRC class classification unit 10, the coefficient memory 11, and the integration operation unit 12) generates the generated pixel P on the basis of the class "4" obtained by the motion estimation class classification unit 7.

Meanwhile, if the motion estimation class classification unit 7 determines at the above-described Step ST196 that the motion vector v2n illustrated in FIG. 5 is not equal to the first motion vector v1, the processing proceeds to Step ST199. At Step ST199, which does not correspond to any of the above-described four states, the motion estimation class classification unit 7 sets a class "5" as the class to be used in the class classification adaptation processing. Then, the processing proceeds to Step ST200.

In the above-described manner, the class classification and the conversion into binary data are performed on the basis of the result of determination of the covered and uncovered areas at the position of the generated pixel P. As describe above, the value of the difference between the first motion vector amount and the second motion vector amount may be classified into four classes, for example, and converted. Alternatively, the absolute value of the second motion vector amount mainly representing the motion of the foreground may be classified into four classes, for example.

Figure 15:
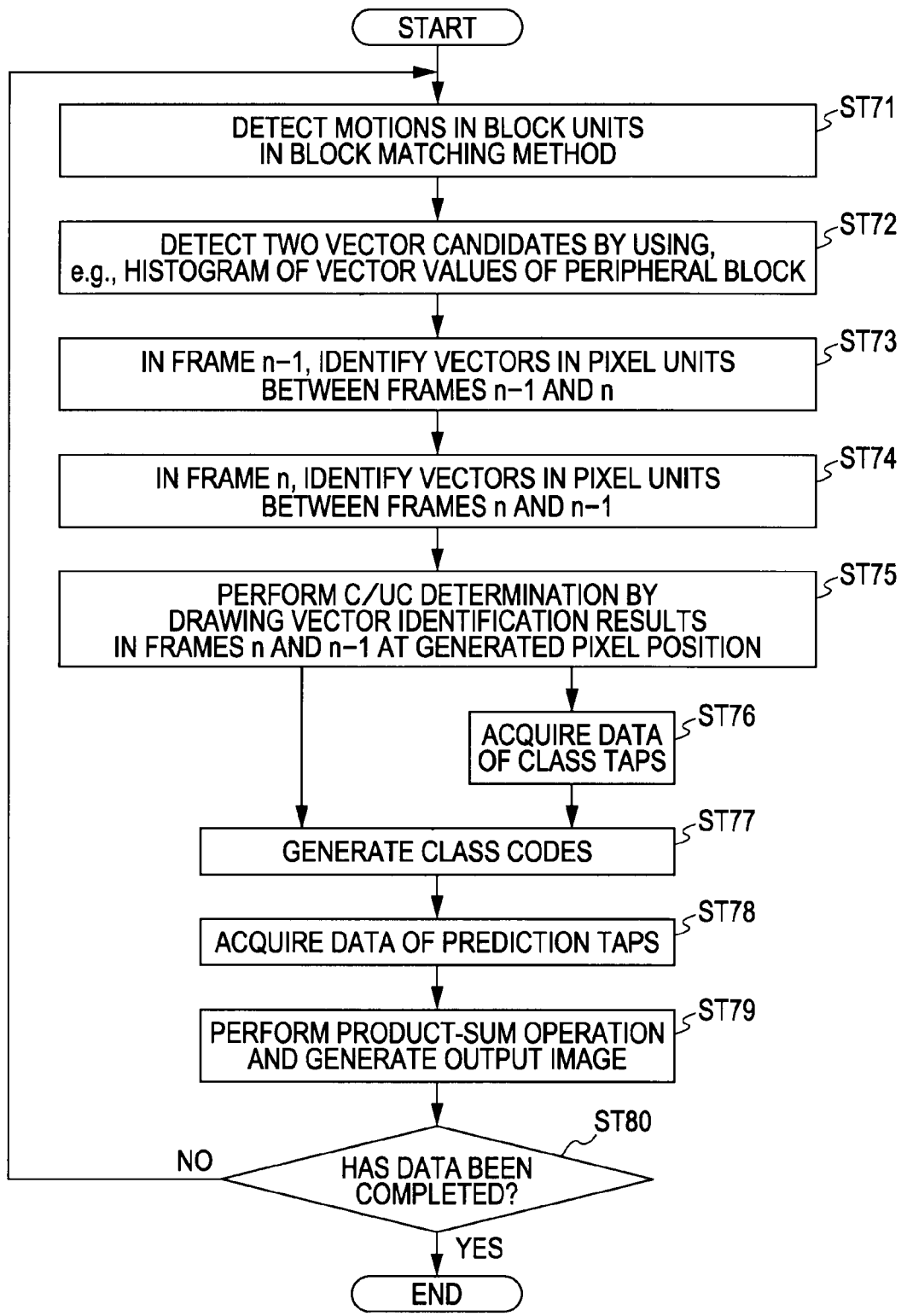
FIG. 15 is a flowchart illustrating an operation example of the frame interpolation device.

Subsequently, an operation example of the frame interpolation device 200 will be described. FIG. 15 is a flowchart illustrating an operation example of the frame interpolation device 200. Steps ST71 to ST75 shown in FIG. 15 correspond to Steps ST51 to ST55 shown in FIG. 9. Thus, detailed description thereof will be omitted.

At Step ST71 shown in FIG. 15, the motion vector detection unit 1 illustrated in FIG. 13 detects motion vectors in block units of approximately 8 by 8 pixels, for example, and in accordance with the block matching method. Then, the processing proceeds to Step ST72.

At Step ST72, the candidate vector extraction unit 2 converts the data of all motion vectors obtained by the motion vector detection unit 1 into a histogram, and determines a motion vector indicating the maximum value of the histogram to be a background vector representing the motion of the background. The candidate vector extraction unit 2 converts the motion vectors of the periphery of the target block $BK_{n-1}$ (see FIG. 3A, for example) including the generated pixel into a histogram, and obtains a motion vector indicating the maximum value of the histogram and a motion vector indicating the second local maximum value, for example. The candidate vector extraction unit 2 obtains the candidate vectors of the above-described target block $BK_{n-1}$ by determining a motion vector close to the previously obtained background vector to be the first motion vector and a motion vector far from the background vector to be the second motion vector. Then, the processing proceeds to Step ST73.

At Step ST73, the (n−1) to (n) motion estimation unit 3 identifies the motion vectors in pixel units between the reference frames n−1 and n. For example, the (n−1) to (n) motion estimation unit 3 calculates the difference absolute value sums between the target block $BK_{n-1}$ and the blocks BK1 and BK2 in the reference frame n indicated by the first and second motion vectors of the target block $BK_{n-1}$ in the reference frame n−1. Then, the (n−1) to (n) motion estimation unit 3 identifies the motion vector corresponding to the smaller difference absolute value sum. Then, the processing proceeds to Step ST74.

At Step ST74, the (n) to (n−1) motion estimation unit 4 identifies the motion vectors in pixel units between the reference frames n and n−1. For example, the (n) to (n−1) motion estimation unit 4 calculates the difference absolute value sums between the target block $BK_n$ and the blocks BK1 and BK2 in the reference frame n−1 indicated by the first and second motion vectors of the target block $BK_n$ in the reference frame n. Then, the (n) to (n−1) motion estimation unit 4 identifies the motion vector corresponding to the smaller difference absolute value sum. Then, the processing proceeds to Step ST75.

At Step ST75, the motion estimation class classification unit 7 performs the covered/uncovered (C/UC) determination (see FIG. 14) by drawing the identification results of the motion vectors in the reference frames n and n−1 at the position of the generated pixel P. Then, the processing proceeds to Step ST76.

At Step ST76, the class tap selection unit 9 selects, from the reference frames n−1 and n illustrated in FIGS. 8A and 8B, the pixels subjected to the motion compensation (MC) with the distance ratios b/a and (a−b)/a. Then, the processing proceeds to Step ST77.

At Step ST77, the ADRC class classification unit 10 generates class codes. For example, the ADRC class classification unit 10 converts the waveform feature quantity of the pixels input from the class tap selection unit 9 into binary data by using the 1-bit ADRC. The binary data obtained by the ADRC class classification unit 10 and the binary data obtained from the C/UC determination by the motion estimation class classification unit 7 are added together to form the class codes of the coefficient memory 11. Then, the processing proceeds to Step ST78.

At Step ST78, the prediction tap selection unit 8 selects, from the reference frames n−1 and n illustrated in FIGS. 8A and 8B, the pixels subjected to the motion compensation (MC) with the distance ratios b/a and (a−b)/a. Then, the processing proceeds to Step ST79.

At Step ST79, the integration operation unit 12 performs a product-sum operation of the coefficient data received from the coefficient memory 11 and the pixel values read by the prediction tap selection unit 8, to thereby generate an output pixel. For example, the coefficient memory 11 stores, for each of the classes, the coefficient data acquired by learning the relationship between a clear teacher image signal with little motion blur (second image signal) obtained at half the shutter speed and a student image signal with motion blur (first image signal) obtained at a normal shutter speed. The coefficient data is information used for conversion into a signal in which the luminance level has been corrected by a linear estimation formula and the blur has been removed. A method of acquiring the coefficient data will be described later.

At an address position corresponding to a class classification code, the coefficient memory 11 reads the coefficient data of the corresponding class, and supplies the coefficient data to the integration operation unit 12. The integration operation unit 12 performs the linear combination operation shown in the formula (1) by using coefficient data $w_1, w_2, \ldots,$ and $w_n$ and luminance data $x_1, x_2, \ldots,$ and $x_n$ of prediction taps received from the prediction tap selection unit 8, to thereby calculate new luminance data of a target pixel.

Formula 1

$$E[y]=w_1x_1+w_2x_2+\ldots+w_ix_i \tag{1}$$

Then, the processing proceeds to Step ST80 to determine whether or not the input image signal Din has been completed. If the input image signal Din has not been completed, the processing returns to Step ST71. If the input image signal Din has been completed, the processing is completed.

As described above, the frame interpolation device 200 as the second embodiment performs the frame interpolation by using the class classification adaptation processing. Accordingly, the blur is removed, and the boundary area between the background and the foreground can be favorably reproduced.

Figure 16:
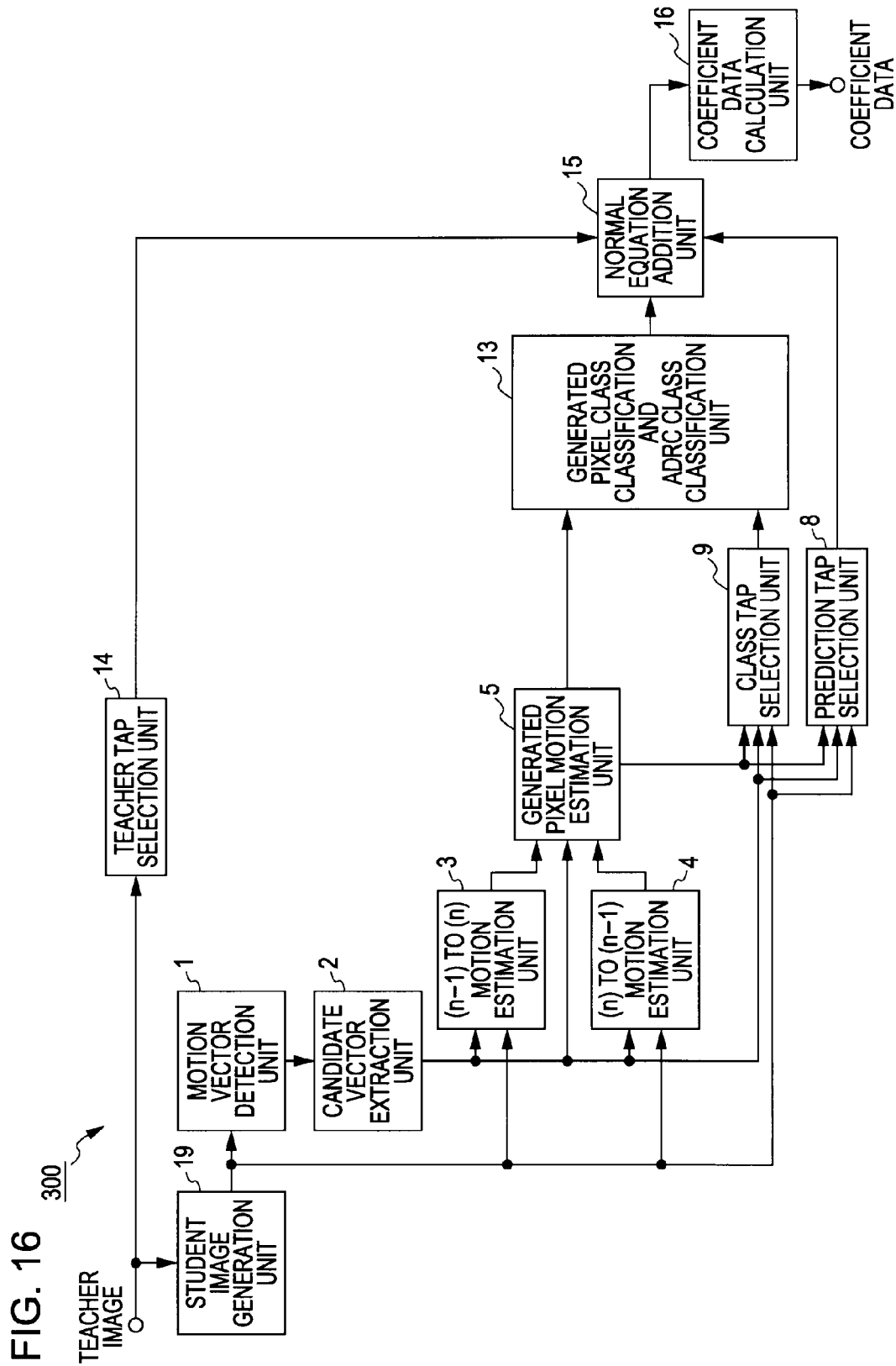
FIG. 16 is a block diagram illustrating a configuration example of a coefficient data generation device.
Figure 17:
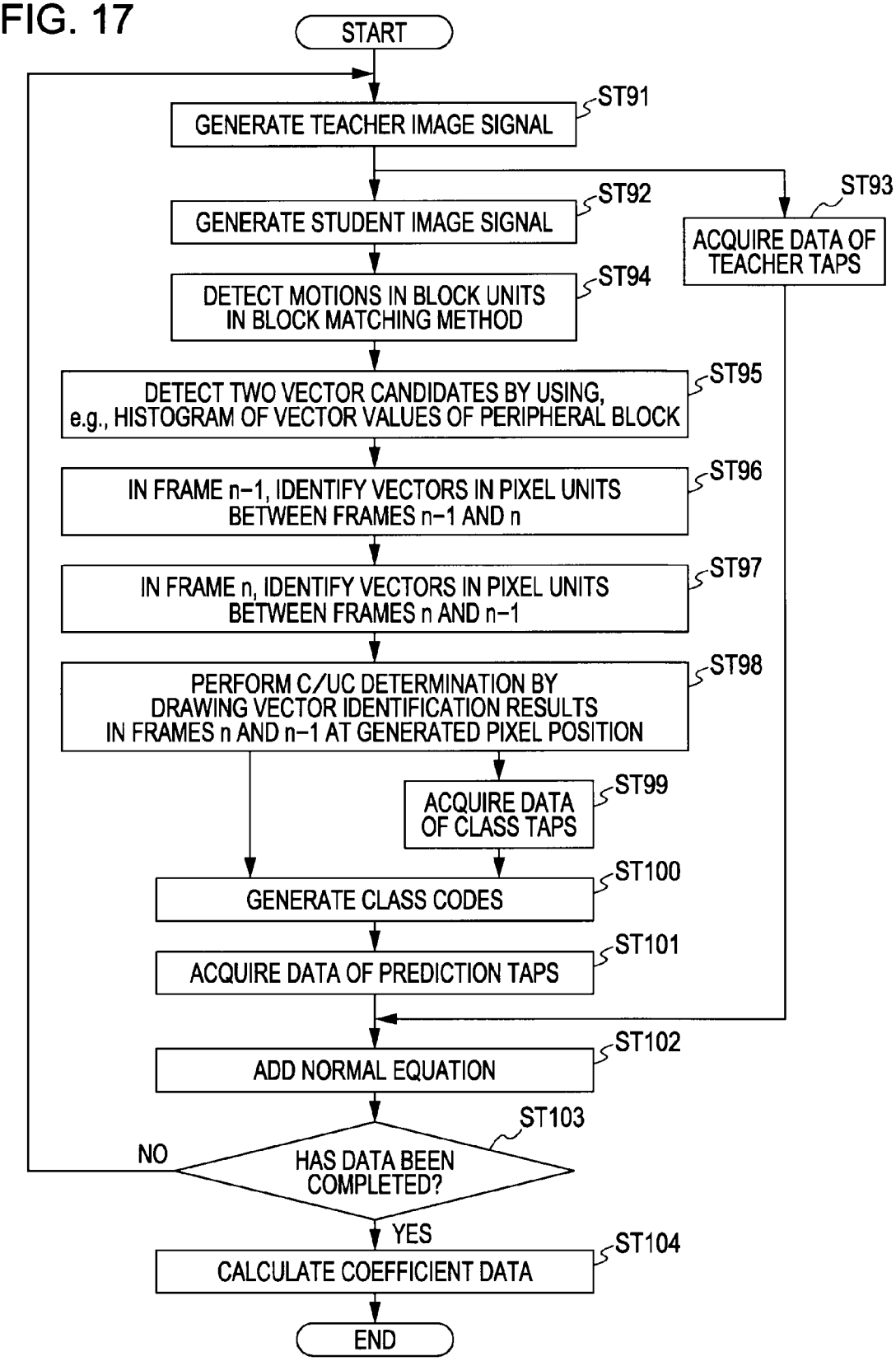
FIG. 17 is a flowchart illustrating an operation example of the coefficient data generation device.

Subsequently, the generation (learning) of the coefficient data will be described. FIG. 16 is a block diagram illustrating a configuration example of a coefficient data generation device 300. FIG. 17 is a flowchart illustrating an operation example of the coefficient data generation device 300.

Figure 18:
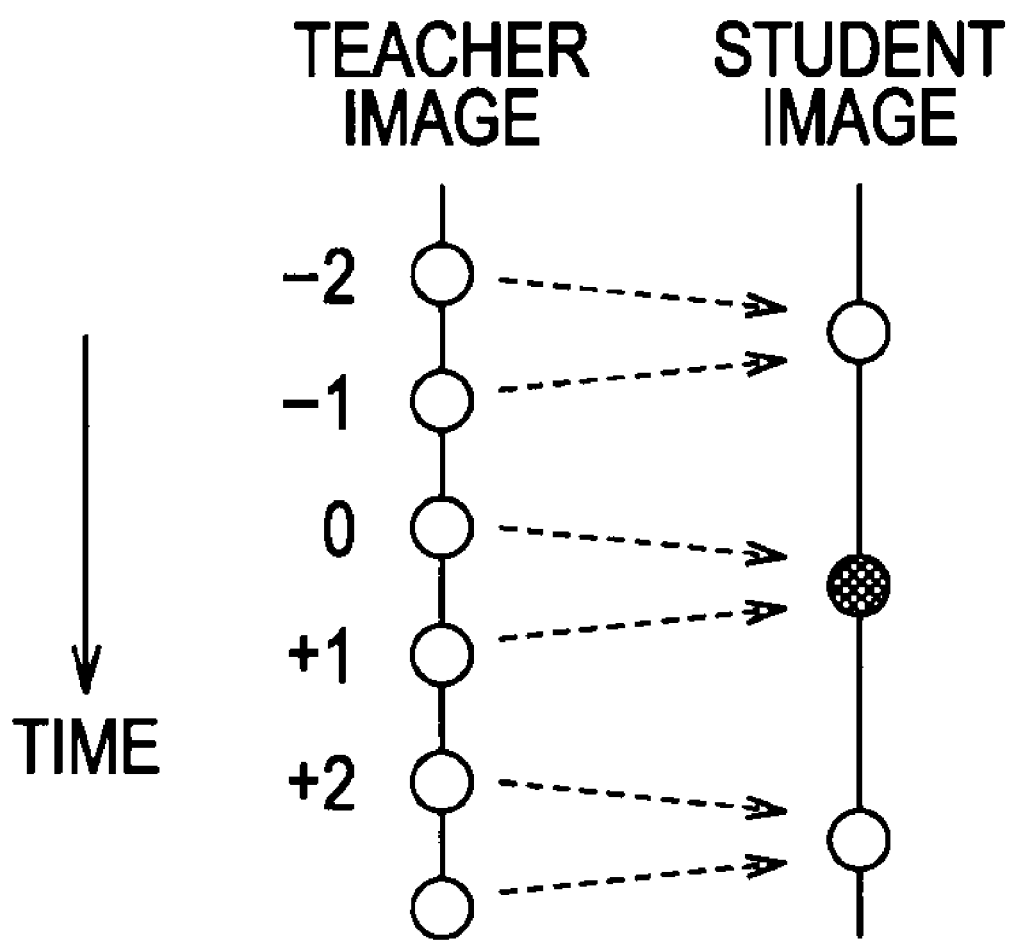
FIG. 18 is a schematic diagram illustrating an example of the generation of a student image signal.

At Steps ST91 and ST92 shown in FIG. 17, a student image generation unit 19 generates, from a teacher image signal of a luminance level with little motion blur obtained at half the shutter speed, a student image signal with motion blur obtained at a normal shutter speed. For example, the student image generation unit 19 averages each two of the frames of the teacher image signal illustrated in FIG. 18, to thereby generate a student image signal shifted by half the time phase from the teacher image signal and having twice the motion blur amount of the teacher image signal. The thus generated student image signal and the teacher image signal are paired to form the coefficient data. Further, at Step ST93, a teacher tap selection unit 14 acquires tap data of the teacher image signal. Then, the processing proceeds to Step ST94.

Steps ST94 to ST101 correspond to Steps ST71 to ST78 shown in FIG. 15. Thus, detailed description thereof will be omitted.

At Step ST94 shown in FIG. 17, the motion vector detection unit 1 illustrated in FIG. 16 detects motion vectors in block units of approximately 8 by 8 pixels, for example, and in accordance with the block matching method. Then, the processing proceeds to Step ST95.

At Step ST95, the candidate vector extraction unit 2 converts the data of all motion vectors obtained by the motion vector detection unit 1 into a histogram, and determines a motion vector indicating the maximum value of the histogram to be a background vector representing the motion of the background. The candidate vector extraction unit 2 converts the motion vectors of the periphery of the target block $BK_{n-1}$(see FIG. 3A, for example) including the generated pixel into a histogram, and obtains a motion vector indicating the maximum value of the histogram and a motion vector indicating the second local maximum value, for example. The candidate vector extraction unit 2 obtains the candidate vectors of the above-described target block $BK_{n-1}$ by determining a motion vector close to the previously obtained background vector to be the first motion vector and a motion vector far from the background vector to be the second motion vector. Then, the processing proceeds to Step ST96.

At Step ST96, the (n−1) to (n) motion estimation unit 3 identifies the motion vectors in pixel units between the reference frames n−1 and n. For example, the (n−1) to (n) motion estimation unit 3 calculates the difference absolute value sums between the target block $BK_{n-1}$ and the blocks BK1 and BK2 in the reference frame n indicated by the first and second motion vectors of the target block $BK_{n-1}$ in the reference frame n−1. Then, the (n−1) to (n) motion estimation unit 3 identifies the motion vector corresponding to the smaller difference absolute value sum. Then, the processing proceeds to Step ST97.

At Step ST97, the (n) to (n−1) motion estimation unit 4 identifies the motion vectors in pixel units between the reference frames n and n−1. For example, the (n) to (n−1) motion estimation unit 4 calculates the difference absolute value sums between the target block $BK_n$ and the blocks BK1 and BK2 in the reference frame n−1 indicated by the first and second motion vectors of the target block $BK_n$ in the reference frame n. Then, the (n) to (n−1) motion estimation unit 4 identifies the motion vector corresponding to the smaller difference absolute value sum. Then, the processing proceeds to Step ST98.

At Step ST98, the generated pixel motion estimation unit 5 performs the covered/uncovered (C/UC) determination (see FIGS. 4 to 6) by drawing the identification results of the motion vectors in the reference frames n and n−1 at the position of the generated pixel P. Then, the processing proceeds to Step ST99.

At Step ST99, the class tap selection unit 9 selects, from the reference frames n−1 and n illustrated in FIGS. 8A and 8B, the data of class taps subjected to the motion compensation (MC) with the distance ratios b/a and (a−b)/a. Then, the processing proceeds to Step ST100.

At Step ST100, a generated pixel class classification and ADRC class classification unit 13 generates class codes. For example, the class classification unit 13 converts the waveform feature quantity of the pixels input from the class tap selection unit 9 into binary data by using the 1-bit ADRC. Further, the class classification unit 13 performs class classification and conversion into binary data on the basis of the C/UC determination result at the position of the generated pixel P, for example. Then, the class classification unit 13 adds together the binary data of the 1-bit ADRC representing the waveform feature quantity and the binary data obtained from the C/UC determination, to thereby generate the class codes. Then, the processing proceeds to Step ST101.

At Step ST101, the prediction tap selection unit 8 selects, from the reference frames n−1 and n illustrated in FIGS. 8A and 8B, the data of prediction taps subjected to the motion compensation (MC) with the distance ratios b/a and (a−b)/a. For example, a plurality of peripheral pixels around the generated pixel are selected as the prediction taps from the reference frames n−1 and n. Then, the processing proceeds to Step ST102.

At Step ST102, a normal equation addition unit 15 generates and supplies normal equation data to a coefficient data calculation unit 16. Then, the processing proceeds to Step ST103. At Step ST103, whether or not the student image signal has been completed is determined. If the student image signal has not been completed, the processing returns to Step ST91. If the student image signal has been completed, the processing proceeds to Step ST104.

At Step ST104, the coefficient data calculation unit 16 performs arithmetic operation processing using the normal equation data, to thereby calculate the coefficient data.

Description will be made below of a more generalized example of the calculation of the coefficient data, in which prediction using the n number of pixels is performed. When the luminance levels of the input pixels selected as the prediction taps are represented as $x_1, x_2, \ldots,$ and $x_n$ and the output luminance level is represented as E|y|, the linear estimation formula for the n number of taps is set for the coefficient data $w_1, w_2, \ldots,$ and $w_n$ for each of the classes. The linear estimation formula is shown in the following formula (2).

Formula 2

$$E[y]=w_1x_1+w_2x_2+\ldots+w_1x_1 \qquad (2)$$

As a method of calculating the coefficient data $w_1, w_2, \ldots,$ and $w_n$ in the formula (2), the solution according to a least squares method is conceivable. According to the solution, data is collected to form the observation equation of the formula (3), wherein X represents the luminance level of the input pixel, W represents the coefficient data, and Y' represents the luminance level of the output pixel. In the formula (3), m represents the number of learned data items, and n represents the number of prediction taps, as described above.

Formula 3

$$X = \begin{bmatrix} X_{11} & X_{12} & \cdots & X_{1n} \\ X_{21} & X_{22} & \cdots & X_{2n} \\ \cdots & \cdots & \cdots & \cdots \\ X_{m1} & X_{m2} & \cdots & X_{mn} \end{bmatrix} \qquad (3)$$

$$W = \begin{bmatrix} W_1 \\ W_2 \\ \cdots \\ W_m \end{bmatrix},$$

$$Y' = \begin{bmatrix} E[y_1] \\ E[y_2] \\ \cdots \\ E[y_m] \end{bmatrix}$$

$$XW = Y'$$

Then, on the basis of the observation equation of the formula (3), the residual equation of the formula (4) is formed.

Formula 4

$$E = \begin{bmatrix} e_1 \\ e_2 \\ \cdots \\ e_m \end{bmatrix}, \qquad (4)$$

$$Y = \begin{bmatrix} y_1 \\ y_2 \\ \cdots \\ y_m \end{bmatrix}$$

$$XW = Y + E$$

It is considered from the formula (4) that the most probable value of each coefficient data item $w_i$, i.e., a condition for minimizing the value of the formula (5) holds.

Formula 5

$$\sum_{i=1}^{m} e_i^2 \quad (5)$$

That is, the condition of the formula (6) should be taken into account.

Formula 6

$$e_1 \frac{\partial e_1}{\partial w_i} + e_2 \frac{\partial e_2}{\partial w_i} + \ldots + e_m \frac{\partial e_m}{\partial w_i} = 0 \; (i = 1, 2, \ldots, n) \quad (6)$$

The n number of conditions based on the value i of the formula (6) should be thought of. Further, the values $w_1$, $w_2, \ldots,$ and $w_n$ satisfying the conditions should be calculated. Therefore, the following formula (7) is derived from the formula (4). Further, and the formula (8) is derived from the formula (6) and the following formula (7).

Formula 7

$$\frac{\partial e_i}{\partial w_i} = x_{i1}, \frac{\partial e_i}{\partial w_i} = x_{i2}, \ldots, \frac{\partial e_i}{\partial w_n} = x_{in} (i = 1, 2, \ldots, m) \quad (7)$$

$$\sum_{i=1}^{m} e_i x_{i1} = 0, \sum_{i=1}^{m} e_i x_{i2} = 0, \ldots, \sum_{i=1}^{m} e_i x_{in} = 0 \quad (8)$$

Then, the normal equations of the following formula (9) can be derived from the formulae (4) and (8).

Formula 8

$$\left(\sum_{i=1}^{m} x_{i1} x_{i1}\right) w_1 + \left(\sum_{i=1}^{m} x_{i1} x_{i2}\right) w_2 + \ldots + \left(\sum_{i=1}^{m} x_{i1} x_{in}\right) w_n = \left(\sum_{i=1}^{m} x_{i1} y_i\right) \quad (8)$$

$$\left(\sum_{i=1}^{m} x_{i2} x_{i1}\right) w_1 + \left(\sum_{i=1}^{m} x_{i2} x_{i2}\right) w_2 + \ldots + \left(\sum_{i=1}^{m} x_{i2} x_{in}\right) w_n = \left(\sum_{i=1}^{m} x_{i2} y_i\right)$$

$$\ldots$$

$$\left(\sum_{i=1}^{m} x_{in} x_{i1}\right) w_1 + \left(\sum_{i=1}^{m} x_{in} x_{i2}\right) w_2 + \ldots + \left(\sum_{i=1}^{m} x_{in} x_{in}\right) w_n = \left(\sum_{i=1}^{m} x_{in} y_i\right) \quad (9)$$

The normal equations of the formula (9) are simultaneous equations including the n number of unknowns. Therefore, the most probable value of each data item $w_i$ can be calculated from the simultaneous equations. In fact, the simultaneous equations are solved with the sweep-out method (Gauss-Jordan elimination method). The normal equations of the formula (9) are solved to determine the coefficient data $w_1$, $w_2, \ldots,$ and $w_n$ for each of the classes.

As a result of the learning performed as described above, the coefficient data is calculated which is used to estimate the luminance level of the target pixel for each of the classes, and which enables the estimation of a value statistically closest to the true value. The calculated coefficient data is written into the coefficient memory 11 of the above-described frame interpolation device 200.

Figure 19A:
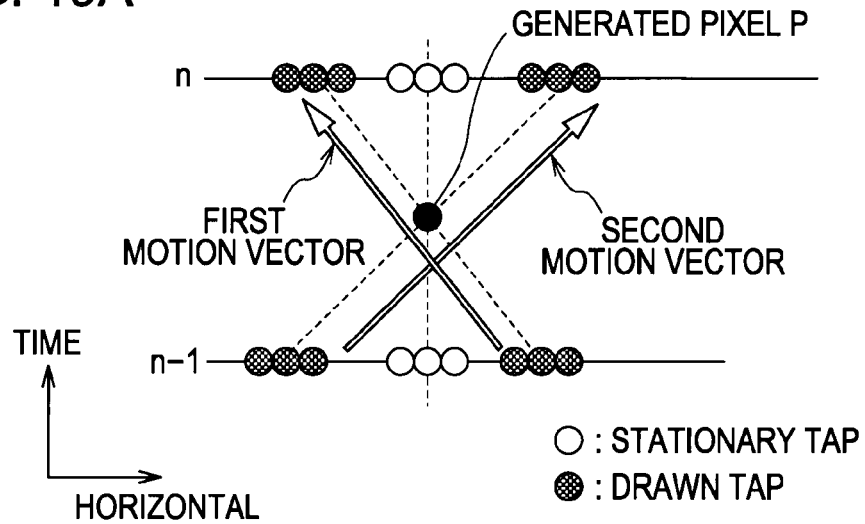
FIGS. 19A to 19C are schematic diagrams illustrating pattern examples of prediction taps and class taps.
Figure 19B:
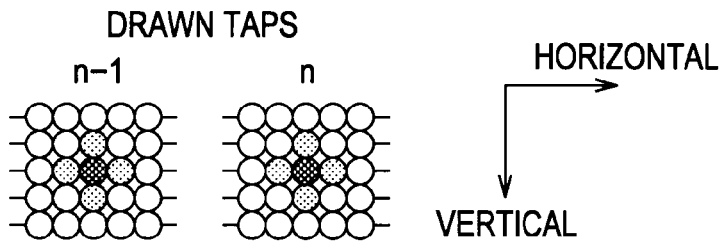
Figure 19C:
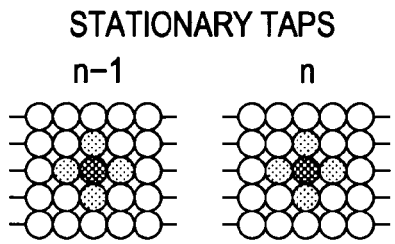

FIGS. 19A to 19C are schematic diagrams illustrating pattern examples of the prediction taps and the class taps. The taps are constructed by being extracted from drawn taps based on the first and second motion vector amounts and stationary taps representing stationary portions. For example, with respect to the generated pixel P illustrated in FIG. 19A, the prediction tap selection unit 8 acquires, from the reference frame n−1, drawn taps formed by five pixels and stationary taps formed by five pixels, as the prediction taps. Further, the prediction tap selection unit 8 acquires, from the reference frame n, drawn taps formed by five pixels and stationary taps formed by five pixels, as the prediction taps.

Further, with respect to the generated pixel P illustrated in FIG. 19A, the class tap selection unit 9 acquires, from the reference frame n−1, a drawn tap formed by one pixel and a stationary tap formed by one pixel, as the class tap. Further, the class tap selection unit 9 acquires, from the reference frame n, a drawn tap formed by one pixel and a stationary tap formed by one pixel, as the class tap.

Figure 20A:
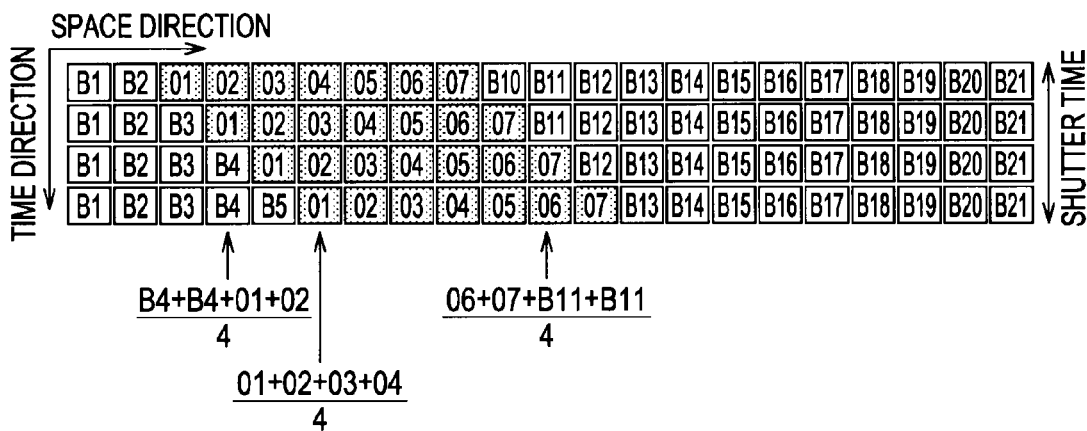
FIGS. 20A and 20B are explanatory diagrams illustrating examples of the mixture of a foreground object component and a background object component.
Figure 20B:
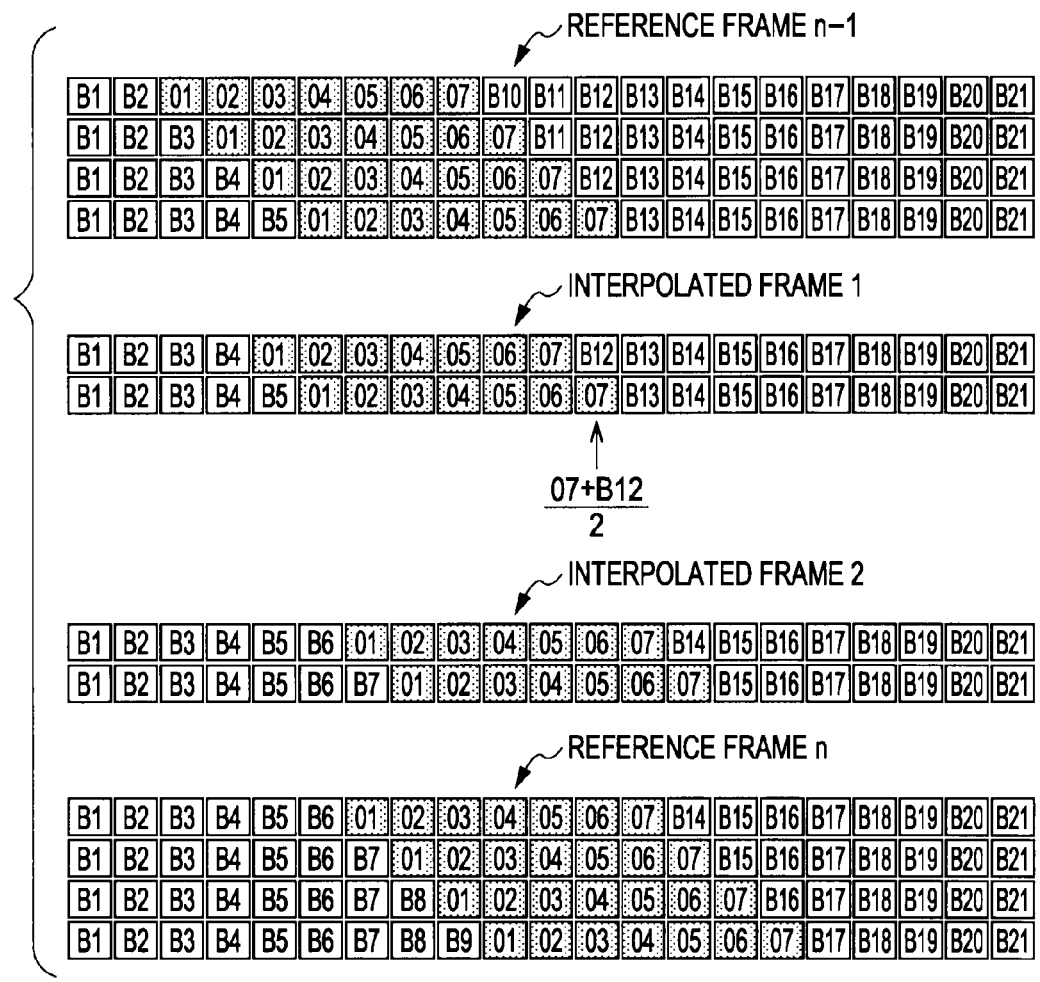

FIGS. 20A and 20B are explanatory diagrams illustrating examples of the mixture of a foreground object component and a background object component. The pixel values corresponding to one line of an image illustrated in FIGS. 21A and 21B are developed in the time direction. The pixel values of the one line are obtained by, for example, a detection device of a CCD (Charge-Coupled Device) which accumulates an amount of electric charge corresponding to integrated light as a result of integration of light input during a time period corresponding to the shutter time. Pixels B1 to B21 illustrated in FIGS. 20A and 20B represent the background, and pixels 01 to 07 represent the foreground. The motion amount of the image of an object corresponding to the foreground is "4." In this case, the fourth pixel in the space direction, for example, corresponds to the uncovered area. The pixel value of the fourth pixel is calculated as (B4+B4+01+02)/4, as illustrated in FIG. 20A. That is, the fourth pixel in the space direction includes the mixture of foreground object components and background object components. Further, the sixth pixel in the space direction corresponds to the foreground area. The pixel value of the sixth pixel is calculated as (01+02+03+04)/4, as illustrated in FIG. 20A. That is, the sixth pixel in the space direction includes only foreground object components. Further, the eleventh pixel in the space direction corresponds to the covered area. The pixel value of the eleventh pixel is calculated as (06+07+B11+B11)/4, as illustrated in FIG. 20A. That is, the eleventh pixel in the space direction includes the mixture of foreground object components and background object components.

The images of interpolated frames 1 and 2 illustrated in FIG. 20B are generated by reducing the shutter time by half. For example, the twelfth pixel in the space direction of the interpolated frame 1 corresponds to the covered area. The pixel value of the twelfth pixel is calculated as (07+B12)/2, as illustrated in FIG. 20B. That is, the twelfth pixel in the space direction includes the mixture of a foreground object component and a background object component.

As described above, in the covered and uncovered areas, a foreground object component and a background object component are mixed. Therefore, simple drawing of pixel values results in an unnatural image. In the embodiment of the present invention, the covered and uncovered areas are classified into the classes, and the pixel values to be mixed in the covered and uncovered areas are drawn from two motion vector values. Further, the mixture ratio of the pixel values is learned to derive an optimal coefficient. Accordingly, it is possible to form a natural image to be interpolated.

Figure 21:
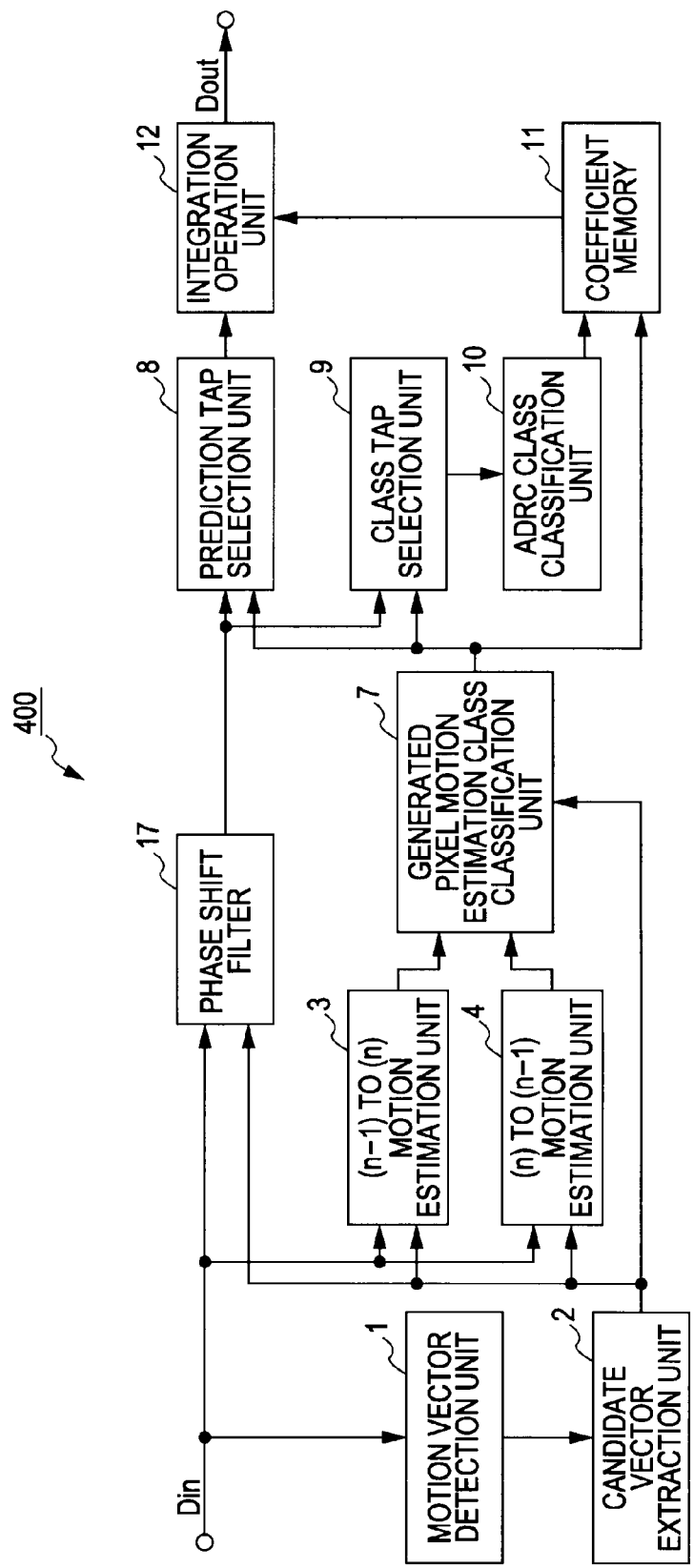
FIG. 21 is a block diagram illustrating a configuration example of a frame interpolation device as a third embodiment of the present invention.

Subsequently, a frame interpolation device 400 as a third embodiment of the present invention will be described. FIG. 21 is a block diagram illustrating a configuration example of the frame interpolation device 400 as the third embodiment of the present invention. The frame interpolation device 400 illustrated in FIG. 21 corresponds to the configuration of the frame interpolation device 200 illustrated in FIG. 13 added with a phase shift filter 17. The phase shift filter 17 uses, for example, a bicubic filter which interpolates pixels in the space direction of the input image signal. The bicubic filter performs a method of sampling sixteen pixels around a target point in image interpolation and performing the interpolation by assuming a three-dimensional curve. The phase shift filter 17 receives an input of the input image signal Din, and compensates for even a motion amount equal to or smaller than a pixel of the input image signal Din, to thereby generate an image of higher accuracy.

Figure 22:
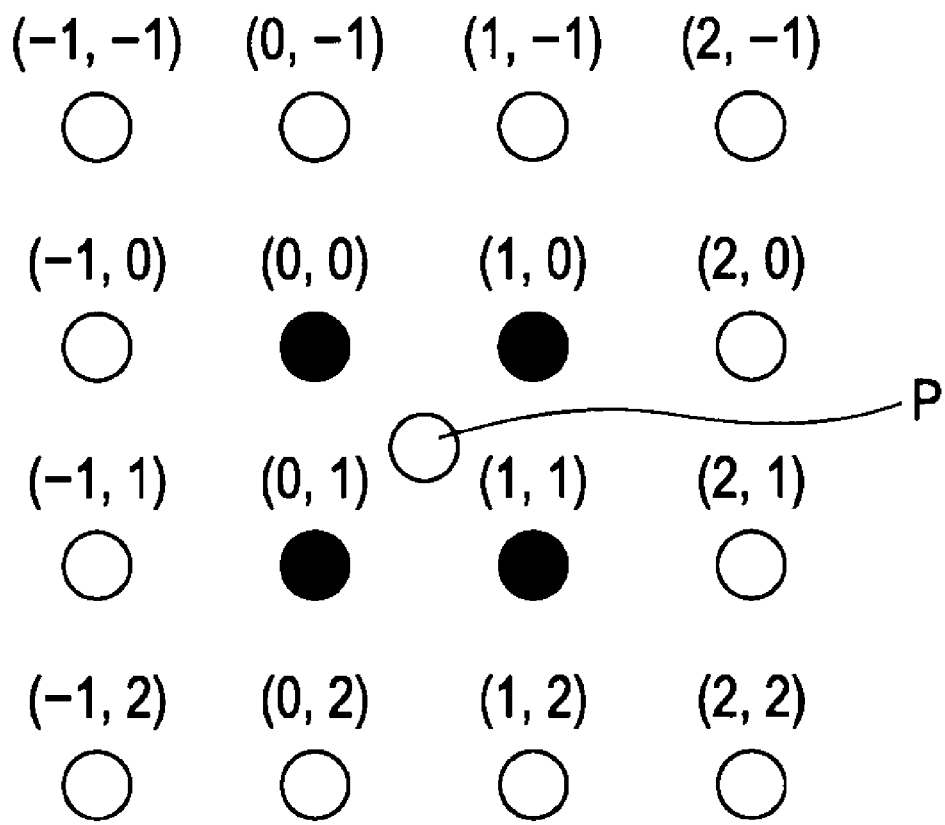
FIG. 22 is a schematic diagram illustrating an operation example of a phase shift filter.

For example, in the shift of a pixel (i, j) to a predetermined phase, a point indicated by a black dot illustrated in FIG. 22 is referred to as a first neighborhood, and a point indicated by a white dot illustrated in FIG. 22 is referred to as a second neighborhood. For each of the neighborhoods, weights Wx and Wy for distances dx and dy are separately calculated for the X direction and the Y direction, respectively, and the final weight for the corresponding point, i.e., W=Wx×Wy is obtained from the formula (10).

Formula 9

$$w = \begin{cases} (d-1)(d^2-d-1) & \text{First Neighborhood} \\ -(d-1)(d-2)^2 & \text{Second Neighborhood} \end{cases} \quad (10)$$

When W(i, j) and f(i, j) represent the weight and the luminance of the pixel (i, j), respectively, the luminance f'(P) of the generated pixel P is represented by the following formula (11).

Formula 10

$$f'(P) = \sum_{i=-1}^{2} \sum_{j=-1}^{2} w(i, j) f(i, j) \quad (11)$$

As described above, the phase shift filter 17 generates a highly accurate interpolated image by interpolating pixels in the space direction of the input image signal Din, and outputs the generated interpolated image to the prediction tap selection unit 8 and the class tap selection unit 9. The prediction tap selection unit 8 and the class tap selection unit 9 select the taps from the input image signal Din, in which even the motion amounts equal to or smaller than the pixels have been compensated for.

Figure 23:
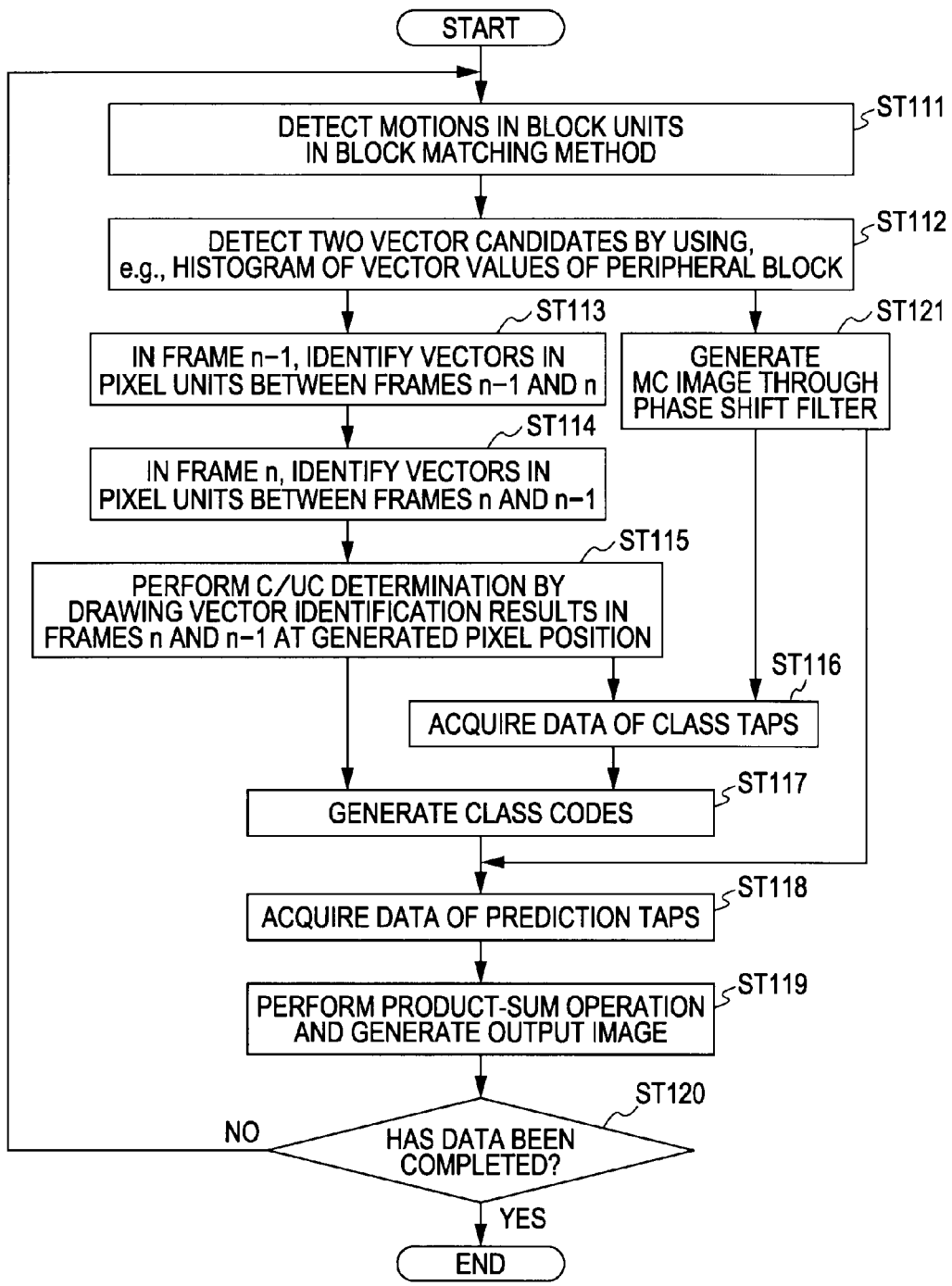
FIG. 23 is a flowchart illustrating an operation example of the frame interpolation device.

Subsequently, an operation example of the frame interpolation device 400 will be described. FIG. 23 is a flowchart illustrating an operation example of the frame interpolation device 400. Steps ST111 to ST120 shown in FIG. 23 correspond to Steps ST71 to ST80 shown in FIG. 15. Thus, detailed description thereof will be omitted.

At Step ST111 shown in FIG. 23, the motion vector detection unit 1 illustrated in FIG. 21 detects motion vectors in block units of approximately 8 by 8 pixels, for example, and in accordance with the block matching method. Then, the processing proceeds to Steps ST112 and ST121.

At Step ST121, with the use of a bicubic filter, for example, the phase shift filter 17 samples sixteen pixels around a target point in image interpolation, and performs the interpolation by assuming a three-dimensional curve.

Further, at Step ST112, the candidate vector extraction unit 2 converts the data of all motion vectors obtained by the motion vector detection unit 1 into a histogram. On the basis of the histogram, the candidate vector extraction unit 2 obtains the candidate vectors of the above-described target block $BK_{n-1}$ by determining a motion vector close to the background vector to be the first motion vector and a motion vector far from the background vector to be the second motion vector. Then, the processing proceeds to Step ST113.

At Step ST113, the (n−1) to (n) motion estimation unit 3 identifies the motion vectors in pixel units between the reference frames n−1 and n. Then, the processing proceeds to Step ST114.

At Step ST114, the (n) to (n−1) motion estimation unit 4 identifies the motion vectors in pixel units between the reference frames n and n−1. Then, the processing proceeds to Step ST115.

At Step ST115, the motion estimation class classification unit 7 performs the covered/uncovered (C/UC) determination (see FIG. 14) by drawing the identification results of the motion vectors in the reference frames n and n−1 at the position of the generated pixel P. Then, the processing proceeds to Step ST116.

At Step ST116, the class tap selection unit 9 selects, from the reference frames n−1 and n illustrated in FIGS. 8A and 8B, the pixels subjected to the motion compensation (MC) with the distance ratios b/a and (a−b)/a. The pixels of the reference frames n−1 and n have been interpolated by the phase shift filter 17. Then, the processing proceeds to Step ST117.

At Step ST117, the ADRC class classification unit 10 generates the class codes. For example, the ADRC class classification unit 10 converts the waveform feature quantity of the pixels input from the class tap selection unit 9 into binary data by using the 1-bit ADRC. The binary data obtained by the ADRC class classification unit 10 and the binary data obtained from the C/UC determination by the motion estimation class classification unit 7 are added together to form the class codes of the coefficient memory 11. Then, the processing proceeds to Step ST118.

At Step ST118, the prediction tap selection unit 8 selects, from the reference frames n−1 and n illustrated in FIGS. 8A and 8B, the pixels subjected to the motion compensation (MC) with the distance ratios b/a and (a−b)/a. The pixels of the reference frames n−1 and n have been interpolated by the phase shift filter 17. Then, the processing proceeds to Step ST119.

At Step ST119, the integration operation unit 12 generates an output pixel by performing a product-sum operation of the coefficient data received from the coefficient memory 11 and the pixel values read by the prediction tap selection unit 8. Then, the processing proceeds to Step ST120 to determine whether or not the input image signal Din has been completed. If the input image signal Din has not been completed, the processing returns to Step ST111. If the input image signal Din has been completed, the processing is completed.

As described above, the frame interpolation device 400 as the third embodiment of the present invention samples sixteen pixels around a target point in image interpolation, and performs the interpolation by assuming a three-dimensional curve. Accordingly, it is possible to generate an image of higher accuracy by compensating for even a motion amount equal to or smaller than a pixel, and thus to accurately perform the motion compensation.

Subsequently, the generation (learning) of the coefficient data will be described. FIG. 24 is a block diagram illustrating a configuration example of a coefficient data generation device 500. FIG. 25 is a flowchart illustrating an operation example of the coefficient data generation device 500.

At Steps ST131 and ST132 shown in FIG. 25, the student image generation unit 19 generates, from a teacher image signal at a luminance level with little motion blur obtained at half the shutter speed, a student image signal with motion blur obtained at a normal shutter speed. Further, at Step ST133, the teacher tap selection unit 14 acquires the tap data of the teacher image signal. Then, the processing proceeds to Step ST134.

Steps ST134 to ST144 correspond to Steps ST94 to ST104 shown in FIG. 17. Thus, detailed description thereof will be omitted.

At Step ST134 shown in FIG. 25, the motion vector detection unit 1 illustrated in FIG. 24 detects motion vectors in block units of approximately 8 by 8 pixels, for example, and in accordance with the block matching method. Then, the processing proceeds to Step ST135.

At Step ST135, the candidate vector extraction unit 2 converts the data of all motion vectors obtained by the motion vector detection unit 1 into a histogram. Then, the candidate vector extraction unit 2 obtains the candidate vectors of the above-described target block $BK_{n-1}$ by determining a motion vector close to the background vector to be the first motion vector and a motion vector far from the background vector to be the second motion vector. Then, the processing proceeds to Steps ST136 and ST145.

At Step ST145, with the use of a bicubic filter, for example, the phase shift filter 17 samples sixteen pixels around a target point in image interpolation, and performs the interpolation by assuming a three-dimensional curve.

Further, at Step ST136, the (n−1) to (n) motion estimation unit 3 identifies the motion vectors in pixel units between the reference frames n−1 and n. Then, the processing proceeds to Step ST137.

At Step ST137, the (n) to (n−1) motion estimation unit 4 identifies the motion vectors in pixel units between the reference frames n and n−1. Then, the processing proceeds to Step ST138.

At Step ST138, the generated pixel motion estimation unit 5 performs the covered/uncovered (C/UC) determination (see FIGS. 4 to 6) by drawing the identification results of the motion vectors in the reference frames n and n−1 at the position of the generated pixel P. Then, the processing proceeds to Step ST139.

At Step ST139, the class tap selection unit 9 selects, from the reference frames n−1 and n illustrated in FIGS. 8A and 8B, the data of the class taps subjected to the motion compensation (MC) with the distance ratios b/a and (a−b)/a. The pixels of the reference frames n−1 and n have been interpolated by the phase shift filter 17. Then, the processing proceeds to Step ST140.

At Step ST140, the generated pixel class classification and ADRC class classification unit 13 generates class codes. For example, the class classification unit 13 converts the waveform feature quantity of the pixels input from the class tap selection unit 9 into binary data by using the 1-bit ADRC. Further, the class classification unit 13 performs class classification and conversion into binary data on the basis of the C/UC determination result at the position of the generated pixel P, for example. Then, the class classification unit 13 adds together the binary data of the 1-bit ADRC representing the waveform feature quantity and the binary data obtained from the C/UC determination, to thereby generate the class codes. Then, the processing proceeds to Step ST141.

At Step ST141, the prediction tap selection unit 8 selects, from the reference frames n−1 and n illustrated in FIGS. 8A and 8B, the data of the prediction taps subjected to the motion compensation (MC) with the distance ratios b/a and (a−b)/a. The pixels of the reference frames n−1 and n have been interpolated by the phase shift filter 17. Then, the processing proceeds to Step ST142.

At Step ST142, the normal equation addition unit 15 generates and supplies the normal equation data to the coefficient data calculation unit 16. Then, the processing proceeds to Step ST143.

At Step ST143, whether or not the student image signal has been completed is determined. If the student image signal has not been completed, the processing returns to Step ST131. If the student image signal has been completed, the processing proceeds to Step ST144.

At Step ST144, the coefficient data calculation unit 16 performs arithmetic operation processing using the normal equation data, to thereby calculate the coefficient data.

The phase shift filter 17 provided to the frame interpolation device 400 of the third embodiment may also be provided to the frame interpolation device 100 of the first embodiment.

The present application contains subject matter related to that disclosed in Japanese Priority Patent Application JP 2008-216641 filed in the Japan Patent Office on Aug. 26, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A frame interpolation device comprising:
    a block division unit configured to divide a first reference frame of a moving image signal and a second reference frame temporally preceding the first reference frame into predetermined block units;
    a motion vector detection unit configured to detect a plurality of motion vectors in block units on the basis of the correlation between respective blocks of the first and second reference frames divided by the block division unit;
    a candidate vector extraction unit configured to calculate the statistical amount of the plurality of motion vectors detected by the motion vector detection unit, and obtain at least first and second motion vectors from the statistical amount;
    a block motion estimation unit configured to estimate the first or second motion vector for each of the blocks on the basis of the first and second motion vectors obtained by the candidate vector extraction unit;
    a generated pixel motion estimation unit configured to translate the first and second motion vectors to pass through the position of a generated pixel in an interpolated frame provided between the first and second reference frames, set local areas at four points of the start points and the end points of the translated first and second motion vectors to be search areas, and identify from the search areas the first or second motion vector estimated by the block motion estimation unit; and
    a frame interpolation unit configured to perform motion compensation on the generated pixel by using the first or second motion vector identified by the generated pixel motion estimation unit.

2. The frame interpolation device according to claim 1, wherein the first motion vector represents the motion of a background, and the second motion vector represents the motion of a foreground, and wherein, when the generated pixel motion estimation unit determines that the motion vector at the end point of the translated second motion vector is substantially equal to the second motion vector, and that the motion vector at the start point of the translated second motion vector is substantially equal to the second motion vector, the generated pixel motion estimation unit obtains a motion vector for performing the motion compensation on the basis of the second motion vector.

3. The frame interpolation device according to claim 2, wherein, when the generated pixel motion estimation unit determines that the motion vector at the end point of the translated first motion vector is substantially equal to the first motion vector, and that the motion vector at the start point of the translated first motion vector is substantially equal to the first motion vector, the generated pixel motion estimation unit obtains a motion vector for performing the motion compensation on the basis of the first motion vector.

4. The frame interpolation device according to claim 3, wherein, when the generated pixel motion estimation unit determines that the motion vector at the start point of the translated second motion vector is substantially equal to the first motion vector, the generated pixel motion estimation unit obtains a motion vector for performing the motion compensation by drawing a pixel on the second reference frame on the basis of the first motion vector.

5. The frame interpolation device according to claim 4, wherein, when the generated pixel motion estimation unit determines that the motion vector at the end point of the translated second motion vector is substantially equal to the first motion vector, the generated pixel motion estimation unit obtains a motion vector for performing the motion compensation by drawing a pixel on the first reference frame on the basis of the first motion vector.

6. The frame interpolation device according to claim 1, wherein, when the moving image signal forms a first image signal and an image signal produced by improving the resolution of the first image signal forms a second image signal, the frame interpolation device comprises:
a first class classification unit configured to classify the class of pixel data at the position of the generated pixel in the second image signal on the basis of the first or second motion vector identified by the generated pixel motion estimation unit;
a coefficient memory configured to store coefficient data which is previously acquired for each of classes classified by the first class classification unit, and which minimizes the error between a student signal corresponding to the first image signal and a teacher signal corresponding to the second image signal and having a high resolution;
a prediction tap selection unit configured to select, from the first image signal, pixel data located in the periphery of the position of the generated pixel in the second image signal; and
an arithmetic operation unit configured to perform an arithmetic operation on the coefficient data stored in the coefficient memory and the pixel data selected by the prediction tap selection unit to obtain the data of the generated pixel in the second image signal.

7. The frame interpolation device according to claim 6, comprising:
a class tap selection unit configured to select, from the first image signal, the pixel data located in the periphery of the position of the generated pixel in the second image signal; and
a second class classification unit configured to detect, from a level distribution of the pixel data selected by the class tap selection unit, the class of the pixel data at the position of the generated pixel in the second image signal,
wherein the coefficient memory stores coefficient data which is previously acquired for each of classes integrating the classes classified by the first class classification unit and classes classified by the second class classification unit, and which minimizes the error between the student signal corresponding to the first image signal and the teacher signal corresponding to the second image signal and having a high resolution.

8. The frame interpolation device according to claim 7, comprising:
a phase shift filter configured to interpolate pixels in the space direction of the first image signal,
wherein the phase shift filter generates an interpolated image signal in which the pixels have been interpolated in the space direction of the first image signal, and outputs the interpolated image signal to the prediction tap selection unit and the class tap selection unit.

9. A frame interpolation method comprising the steps of:
dividing a first reference frame of a moving image and a second reference frame different from the first reference frame in the time direction into predetermined block units;
detecting a plurality of motion vectors in block units on the basis of the correlation between respective blocks of the divided first and second reference frames;
calculating the statistical amount of the detected plurality of motion vectors, and obtaining at least first and second motion vectors from the statistical amount;
estimating the first or second motion vector for each of the blocks on the basis of the obtained first and second motion vectors;
translating the first and second motion vectors to pass through the position of a generated pixel in an interpolated frame provided between the first and second reference frames;
setting local areas at four points of the start points and the end points of the translated first and second motion vectors to be search areas, and estimating the first or second motion vector from the search areas; and
performing motion compensation on the generated pixel by using the estimated first or second motion vector.

* * * * *